United States Patent
Glasco et al.

(10) Patent No.: US 6,925,536 B2
(45) Date of Patent: *Aug. 2, 2005

(54) CACHE COHERENCE DIRECTORY EVICTION MECHANISMS FOR UNMODIFIED COPIES OF MEMORY LINES IN MULTIPROCESSOR SYSTEMS

(75) Inventors: David B. Glasco, Austin, TX (US); Rajesh Kota, Austin, TX (US); Sridhar K. Valluru, Austin, TX (US)

(73) Assignee: Newisys, Inc., Austin, TX (US)

( * ) Notice: Subject to any disclaimer, the term of this patent is extended or adjusted under 35 U.S.C. 154(b) by 303 days.

This patent is subject to a terminal disclaimer.

(21) Appl. No.: 10/289,497

(22) Filed: Nov. 5, 2002

(65) Prior Publication Data

US 2004/0088494 A1 May 6, 2004

(51) Int. Cl.[7] .............................................. G06F 13/00
(52) U.S. Cl. ........................ 711/141; 711/144; 711/145; 711/133; 711/159; 709/218
(58) Field of Search .................. 711/133–136, 141–146, 711/159; 709/217–219

(56) References Cited

U.S. PATENT DOCUMENTS

| 5,257,354 | A |   | 10/1993 | Comfort et al. |         |
|-----------|---|---|---------|----------------|---------|
| 5,394,555 | A | * | 2/1995  | Hunter et al.  | 711/148 |
| 5,524,212 | A |   | 6/1996  | Somani et al.  |         |
| 5,537,574 | A |   | 7/1996  | Elko et al.    |         |
| 5,751,995 | A |   | 5/1998  | Sarangdar      |         |
| 6,088,771 | A |   | 7/2000  | Steely, Jr. et al. |     |
| 6,167,492 | A |   | 12/2000 | Keller et al.  | 711/154 |
| 6,249,846 | B1|   | 6/2001  | Van Doren et al. |       |
| 6,266,743 | B1| * | 7/2001  | Carpenter et al. | 711/143 |
| 6,279,084 | B1|   | 8/2001  | Van Doren et al. |       |
| 6,356,983 | B1| * | 3/2002  | Parks          | 711/145 |

(Continued)

OTHER PUBLICATIONS

*HyperTransport* ™ *I/O Link Specification Revision 1.03*, HyperTransport ™ Consortium, Oct. 10, 2001, Copyright © 2001 HyperTransport Technology Consortium.

Bilir et al., "Multicast Snooping: A New Coherence Method Using a Multicast Address Network", Computer Architecture, 1999. Proceedings of the 26th International Symposium on, May 2–4, 1999.

Martin et al., "Bandwidth Adaptive Snooping", Proceedings of the Eighth International Symposium on High–Performance Computer Architecture on Feb. 2–6, 2002; pp. 251–262.

Sorin et al., "Specifying and Verifying a Broadcast and a Multicast Snooping Cache Coherence Protocol", IEEE Transactions on Parallel and Distributed Systems, vol. 13, No. 6, Jun. 2002.

*Primary Examiner*—Hong Kim
(74) *Attorney, Agent, or Firm*—Beyer Weaver & Thomas LLP

(57) ABSTRACT

Cache coherence directory eviction mechanisms are described for use in computer systems having a plurality of multiprocessor clusters. Interaction among the clusters is facilitated by a cache coherence controller in each cluster. A cache coherence directory is associated with each cache coherence controller identifying memory lines associated with the local cluster which are cached in remote clusters. The cache coherence controller is operable to initiate eviction of an entry in its directory corresponding to an unmodified copy of a memory line by sending a request to write to the memory line to a corresponding memory controller.

13 Claims, 20 Drawing Sheets

U.S. PATENT DOCUMENTS

| | | | |
|---|---|---|---|
| 6,385,705 B1 | 5/2002 | Keller et al. | 711/154 |
| 6,490,661 B1 | 12/2002 | Keller et al. | 711/150 |
| 6,636,906 B1 | 10/2003 | Sharma et al. | |
| 6,662,276 B2 * | 12/2003 | Schoinas | 711/145 |
| 6,663,945 B2 | 12/2003 | Miyano | |
| 6,665,767 B1 * | 12/2003 | Comisky et al. | 711/3 |
| 6,754,782 B2 | 6/2004 | Arimilli et al. | |
| 6,754,787 B2 * | 6/2004 | Miller et al. | 711/152 |
| 6,795,897 B2 * | 9/2004 | Benveniste et al. | 711/118 |
| 6,799,252 B1 | 9/2004 | Bauman | |
| 2001/0010068 A1 * | 7/2001 | Michael et al. | 711/119 |
| 2002/0087778 A1 * | 7/2002 | Schoinas | 711/1 |
| 2003/0097531 A1 * | 5/2003 | Arimilli et al. | 711/146 |
| 2003/0210655 A1 * | 11/2003 | Glasco | 370/244 |
| 2003/0212741 A1 * | 11/2003 | Glasco | 709/203 |
| 2003/0217244 A1 * | 11/2003 | Kelly | 711/168 |
| 2003/0225976 A1 * | 12/2003 | Hokenek et al. | 711/133 |
| 2003/0225978 A1 * | 12/2003 | Glasco | 711/141 |
| 2003/0225979 A1 * | 12/2003 | Glasco | 711/141 |
| 2004/0008677 A1 * | 1/2004 | Cen | 370/389 |
| 2004/0088492 A1 * | 5/2004 | Glasco | 711/141 |
| 2004/0088495 A1 * | 5/2004 | Glasco et al. | 711/141 |
| 2004/0088496 A1 * | 5/2004 | Glasco et al. | 711/141 |

* cited by examiner

Figure 7

| Coherence Directory 701 ||||
|---|---|---|---|
| Memory Line 711 | State 713 | Dirty Data Owner 715 | Occupancy Vector 717 |
| Address 721 | Invalid | N/A | N/A |
| Address 731 | Invalid | N/A | N/A |
| Address 741 | Shared | N/A | Clusters 1,3 |
| Address 751 | Shared | N/A | Clusters 1, 2, 3, 4 |
| Address 761 | Owned | Cluster 4 | Cluster 2, 3, 4 |
| Address 771 | Owned | Cluster 2 | Cluster 2, 4 |
| Address 781 | Modified | Cluster 2 | N/A |
| Address 791 | Modified | Cluster 3 | N/A |
| ... | ... | ... | ... |

Figure 8

| Probe Filter Information 821 | Read Block (Read) 823 | Read Block Modify (Read/Write) 825 |
|---|---|---|
| Invalid 831 | Can use completion bit. Probe home cluster. (801) | Can use completion bit. Probe home cluster. (809) |
| Shared 833 | Can use completion bit. Probe home cluster. (803) | Not applicable |
| Owned 835 | Can use completion bit. Probe remote cluster with line cached in owned state. (805) | Not applicable |
| Modified 837 | Can use completion bit. Probe remote cluster with line cached in modified state. (807) | Can use completion bit. Probe remote cluster. (815) |

Figure 12

| Memory Controller Filter Information 1221 | | |
|---|---|---|
| | Read Block [Read] 1223 | Read Block Modify [Read/Write] 1225 |
| Invalid 1231 | Send request to target. (1201) | Send request to target. (1209) |
| Shared 1233 | Send request to target. (1203) | Send request to target. (1211) |
| Owned 1235 | Forward Probe To Owning Cluster. (1205) | Send request to target. (1213) |
| Modified 1237 | Forward Probe To Modified Cluster. (1207) | Forward Probe To Modified Cluster. (1215) |

CACHE COHERENCE DIRECTORY EVICTION MECHANISMS FOR UNMODIFIED COPIES OF MEMORY LINES IN MULTIPROCESSOR SYSTEMS

CROSS-REFERENCE TO RELATED APPLICATIONS

The subject matter described in the present application is related to U.S. patent application Ser. No. 10/288,347 for METHODS AND APPARATUS FOR MANAGING PROBE REQUESTS filed on Nov. 4, 2002, the entire disclosure of which is incorporated herein by reference for all purposes. The subject matter described in the present application is also related to U.S. patent application Ser. No. 10/289,499 for CACHE COHERENCE DIRECTORY EVICTION MECHANISMS IN MULTIPROCESSOR SYSTEMS filed on Nov. 5, 2002, and Ser. No. 10/289,521 for CACHE COHERENCE DIRECTORY EVICTION MECHANISMS IN MULTIPROCESSOR SYSTEMS filed on Nov. 5, 2002.

BACKGROUND OF THE INVENTION

The present invention generally relates to accessing data in a multiple processor system. More specifically, the present invention provides techniques for managing cache coherence directories in a multiple processor system having a multiple cluster architecture.

Data access in multiple processor systems can raise issues relating to cache coherency. Conventional multiple processor computer systems have processors coupled to a system memory through a shared bus. In order to optimize access to data in the system memory, individual processors are typically designed to work with cache memory. In one example, each processor has a cache that is loaded with data that the processor frequently accesses. The cache is read or written by a processor. However, cache coherency problems arise because multiple copies of the same data can co-exist in systems having multiple processors and multiple cache memories. For example, a frequently accessed data block corresponding to a memory line may be loaded into the cache of two different processors. In one example, if both processors attempt to write new values into the data block at the same time, different data values may result. One value may be written into the first cache while a different value is written into the second cache. A system might then be unable to determine what value to write through to system memory.

A variety of cache coherency mechanisms have been developed to address such problems in multiprocessor systems. One solution is to simply force all processor writes to go through to memory immediately and bypass the associated cache. The write requests can then be serialized before overwriting a system memory line. However, bypassing the cache significantly decreases efficiency gained by using a cache. Other cache coherency mechanisms have been developed for specific architectures. In a shared bus architecture, each processor checks or snoops on the bus to determine whether it can read or write a shared cache block. In one example, a processor only writes an object when it owns or has exclusive access to the object. Each corresponding cache object is then updated to allow processors access to the most recent version of the object.

Bus arbitration is used when both processors attempt to write the same shared data block in the same clock cycle. Bus arbitration logic decides which processor gets the bus first. Although, cache coherency mechanisms such as bus arbitration are effective, using a shared bus limits the number of processors that can be implemented in a single system with a single memory space.

Other multiprocessor schemes involve individual processor, cache, and memory systems connected to other processors, cache, and memory systems using a network backbone such as Ethernet or Token Ring. Multiprocessor schemes involving separate computer systems each with its own address space can avoid many cache coherency problems because each processor has its own associated memory and cache. When one processor wishes to access data on a remote computing system, communication is explicit. Messages are sent to move data to another processor and messages are received to accept data from another processor using standard network protocols such as TCP/IP. Multiprocessor systems using explicit communication including transactions such as sends and receives are referred to as systems using multiple private memories. By contrast, multiprocessor system using implicit communication including transactions such as loads and stores are referred to herein as using a single address space.

Multiprocessor schemes using separate computer systems allow more processors to be interconnected while minimizing cache coherency problems. However, it would take substantially more time to access data held by a remote processor using a network infrastructure than it would take to access data held by a processor coupled to a system bus. Furthermore, valuable network bandwidth would be consumed moving data to the proper processors. This can negatively impact both processor and network performance.

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions. However, using a point-to-point architecture to connect multiple processors in a multiple cluster system sharing a single memory space presents its own problems.

Consequently, it is desirable to provide techniques for improving data access and cache coherency in systems having multiple clusters of multiple processors connected using point-to-point links.

SUMMARY OF THE INVENTION

According to the present invention, cache coherence directory eviction mechanisms are provided for use in computer systems having a plurality of multiprocessor clusters. Interaction among the clusters is facilitated by a cache coherence controller in each cluster. A cache coherence directory is associated with each cache coherence controller identifying memory lines associated with the local cluster which are cached in remote clusters. A variety of techniques for managing eviction of entries in the cache coherence directory are provided.

According to a specific embodiment of the invention, a computer system is provided which includes a plurality of processing nodes each having a cache memory associated therewith. A main memory is shared by the processing nodes. A serialization point is operable to order memory transactions involving the processing nodes and the main memory. The computer system further includes a cache coherence directory operable to store entries corresponding to memory lines stored in selected ones of the cache memories, and an eviction manager operable to designate one of the entries to be evicted and maintain the designated entry in the cache coherence directory at least until the serialization point allows an eviction transaction corresponding to the designated entry to proceed.

According to another specific embodiment of the invention, a computer system is provided which includes a plurality of processor clusters, each cluster including a plurality of local nodes and a cache coherence controller interconnected by a local point-to-point architecture. The computer system also includes memory corresponding to a global memory space, each cluster corresponding to a contiguous portion of the global memory space. Selected ones of the plurality of local nodes in each cluster have a memory controller associated therewith. Each memory controller in each cluster being responsible for a memory range within the corresponding contiguous portion of the global memory space. The cache coherence controller in each cluster has a cache coherence directory associated therewith, entries in the cache coherence directory in each cluster corresponding to memory lines within the corresponding contiguous portion of the global memory space which are cached in remote clusters. The cache coherence controller is operable to initiate an eviction of a first one of the entries corresponding to a modified copy of a first memory line by sending a request to merge an empty data field with the modified copy of the memory line to a first one of the memory controllers corresponding to the first memory line. According to yet another specific embodiment of the invention, the cache coherence controller is operable to initiate an eviction of a first one of the entries corresponding to an unmodified copy of a first memory line by sending a request to write to the first memory line to a first one of the memory controllers corresponding to the first memory line.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 7 is a diagrammatic representation showing a cache coherence directory.

FIG. 8 is a diagrammatic representation showing probe filter information that can be used to reduce the number of probes transmitted to various clusters.

FIG. 12 is a diagrammatic representation showing memory controller filter information.

DETAILED DESCRIPTION OF SPECIFIC EMBODIMENTS

Figure 1A:
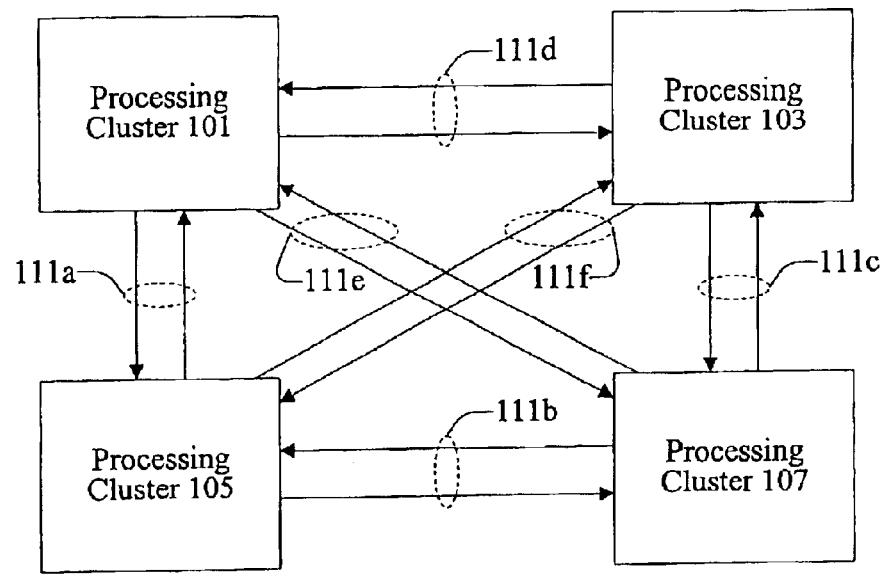
FIGS. 1A and 1B are diagrammatic representation depicting a system having multiple clusters.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multiprocessor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Techniques are provided for increasing data access efficiency in a multiple processor, multiple cluster system. In a point-to-point architecture, a cluster of processors includes multiple processors directly connected to each other through point-to-point links. By using point-to-point links instead of a conventional shared bus or external network, multiple processors are used efficiently in a system sharing the same memory space. Processing and network efficiency are also improved by avoiding many of the bandwidth and latency limitations of conventional bus and external network based multiprocessor architectures. According to various embodiments, however, linearly increasing the number of processors in a point-to-point architecture leads to an exponential increase in the number of links used to connect the multiple processors. In order to reduce the number of links used and to further modularize a multiprocessor system using a point-to-point architecture, multiple clusters are used.

According to various embodiments, the multiple processor clusters are interconnected using a point-to-point architecture. Each cluster of processors includes a cache coherence controller used to handle communications between clusters. In one embodiment, the point-to-point architecture used to connect processors are used to connect clusters as well.

By using a cache coherence controller, multiple cluster systems can be built using processors that may not necessarily support multiple clusters. Such a multiple cluster system can be built by using a cache coherence controller to represent non-local nodes in local transactions so that local nodes do not need to be aware of the existence of nodes outside of the local cluster. More detail on the cache coherence controller will be provided below.

In a single cluster system, cache coherency can be maintained by sending all data access requests through a serialization point. Any mechanism for ordering data access requests is referred to herein as a serialization point. One example of a serialization point is a memory controller. Various processors in the single cluster system send data access requests to one or more memory controllers. In one example, each memory controller is configured to serialize or lock the data access requests so that only one data access request for a given memory line is allowed at any particular time. If another processor attempts to access the same memory line, the data access attempt is blocked until the memory line is unlocked. The memory controller allows cache coherency to be maintained in a multiple processor, single cluster system.

A serialization point can also be used in a multiple processor, multiple cluster system where the processors in the various clusters share a single address space. By using a single address space, internal point-to-point links can be used to significantly improve intercluster communication over traditional external network based multiple cluster systems. Various processors in various clusters send data access requests to a memory controller associated with a particular cluster such as a home cluster. The memory controller can similarly serialize all data requests from the different clusters. However, a serialization point in a multiple processor, multiple cluster system may not be as efficient as a serialization point in a multiple processor, single cluster system. That is, delay resulting from factors such as latency from transmitting between clusters can adversely affect the response times for various data access requests. It should be noted that delay also results from the use of probes in a multiple processor environment.

Although delay in intercluster transactions in an architecture using a shared memory space is significantly less than the delay in conventional message passing environments using external networks such as Ethernet or Token Ring, even minimal delay is a significant factor. In some applications, there may be millions of data access requests from a processor in a fraction of a second. Any delay can adversely impact processor performance.

According to various embodiments, probe management is used to increase the efficiency of accessing data in a multiple processor, multiple cluster system. A mechanism for eliciting a response from a node to maintain cache coherency in a system is referred to herein as a probe. In one example, a mechanism for snooping a cache is referred to as a probe. A response to a probe can be directed to the source or target of the initiating request. Any mechanism for filtering or reducing the number of probes and probe requests transmitted to various nodes is referred to herein as managing probes. In one example, managing probe entails characterizing a probe request to determine if a probe can be transmitted to a reduced number of entities.

In typical implementations, probe requests are sent to a memory controller that broadcasts probes to various nodes in a system. In such a system, no knowledge of the cache line state is known. All nodes in the system are probed and the request cluster receives a response from each node. In a system with a coherence directory, state information associated with various memory lines can be used to reduce the number of transactions. Any mechanism for maintaining state information associated with various memory lines is referred to herein as a coherence directory. A coherence directory typically includes information for memory lines in a local cluster that are cached in a remote cluster. According to various embodiments, a coherence directory is used to reduce the number of probes to remote quads by inferring the state of local caches.

FIG. 1A is a diagrammatic representation of one example of a multiple cluster, multiple processor system that can use the techniques of the present invention. Each processing cluster 101, 103, 105, and 107 can include a plurality of processors. The processing clusters 101, 103, 105, and 107 are connected to each other through point-to-point links 111a–f. In one embodiment, the multiple processors in the multiple cluster architecture shown in FIG. 1A share the same memory space. In this example, the point-to-point links 111a–f are internal system connections that are used in place of a traditional front-side bus to connect the multiple processors in the multiple clusters 101, 103, 105, and 107. The point-to-point links may support any point-to-point coherence protocol.

Figure 1B:
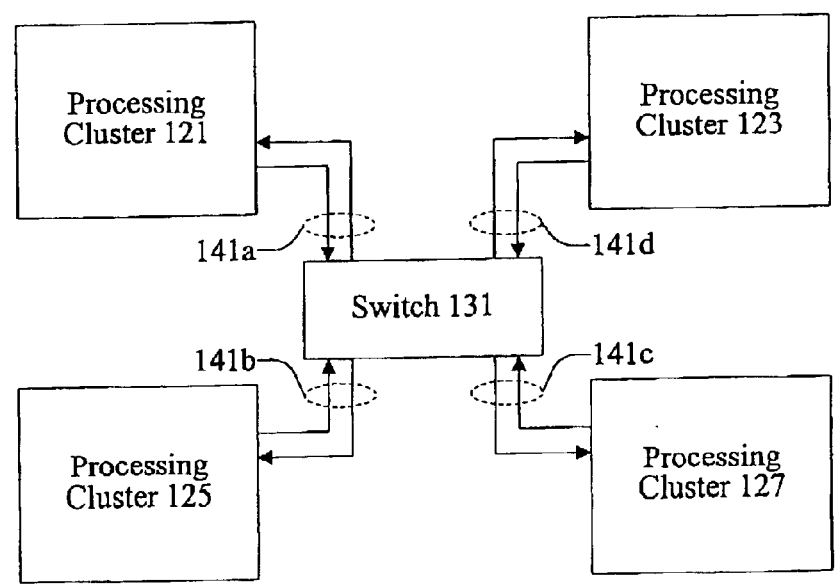

FIG. 1B is a diagrammatic representation of another example of a multiple cluster, multiple processor system that can use the techniques of the present invention. Each processing cluster 121, 123, 125, and 127 can be coupled to a switch 131 through point-to-point links 141a–d. It should be noted that using a switch and point-to-point links allows implementation with fewer point-to-point links when connecting multiple clusters in the system. A switch 131 can include a processor with a coherence protocol interface. According to various implementations, a multicluster system shown in FIG. 1A is expanded using a switch 131 as shown in FIG. 1B.

Figure 2:
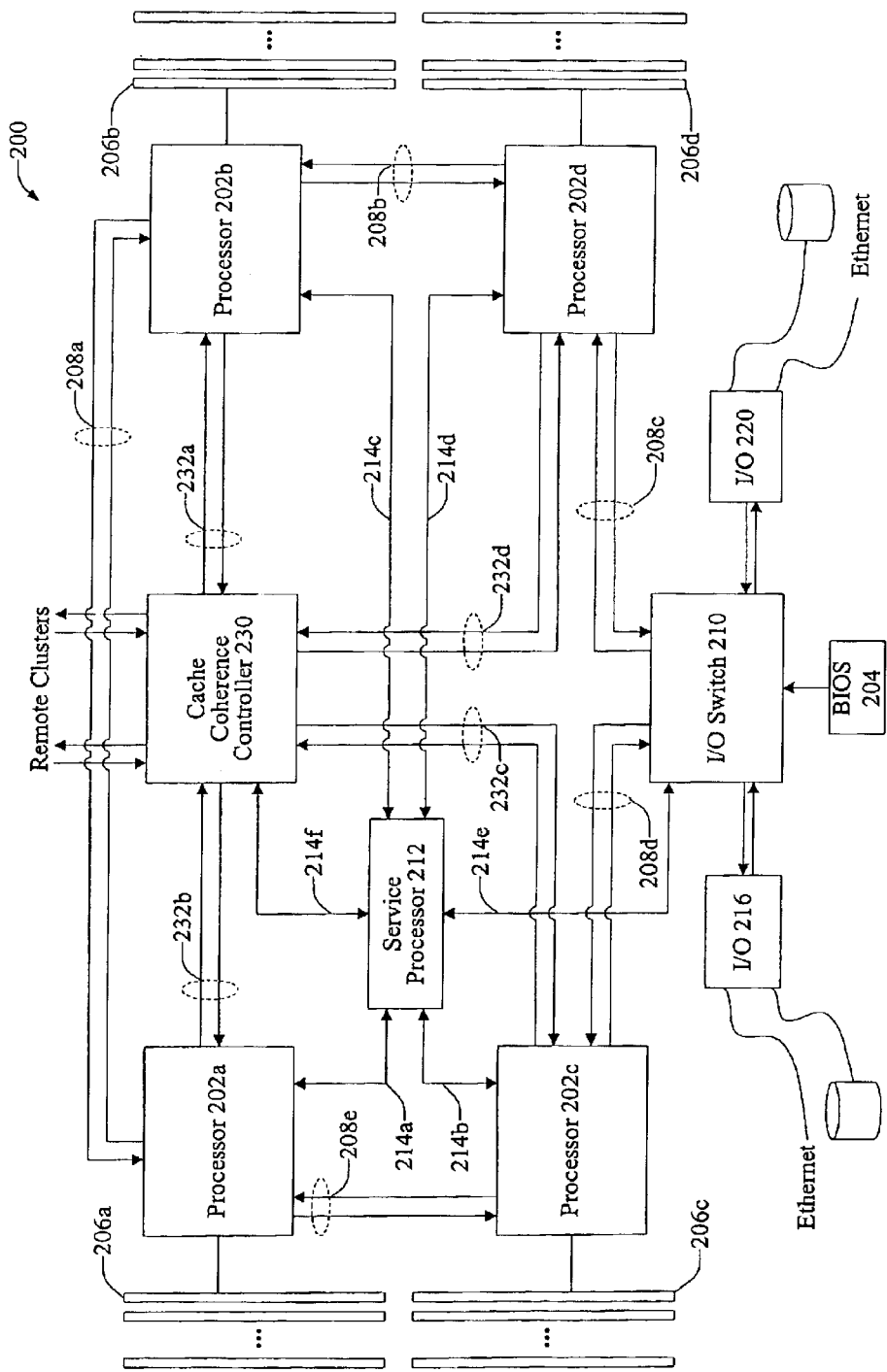
FIG. 2 is a diagrammatic representation of a cluster having a plurality of processors.

FIG. 2 is a diagrammatic representation of a multiple processor cluster, such as the cluster 101 shown in FIG. 1A. Cluster 200 includes processors 202a–202d, one or more Basic I/O systems (BIOS) 204, a memory subsystem comprising memory banks 206a–206d, point-to-point communication links 208a–208e, and a service processor 212. The point-to-point communication links are configured to allow interconnections between processors 202a–202d, I/O switch 210, and cache coherence controller 230. The service processor 212 is configured to allow communications with processors 202a–202d, I/O switch 210, and cache coherence controller 230 via a JTAG interface represented in FIG. 2 by links 214a–214f. It should be noted that other interfaces are supported. It should also be noted that in some implementations, a service processor is not included in multiple processor clusters. I/O switch 210 connects the rest of the system to I/O adapters 216 and 220. It should further be noted that the terms node and processor are often used interchangeably herein. However, it should be understood that according to various implementations, a node (e.g., processors 202a–202d) may comprise multiple sub-units, e.g., CPUs, memory controllers, I/O bridges, etc.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein.

The processors 202a–d are also coupled to a cache coherence controller 230 through point-to-point links 232a–d. Any mechanism or apparatus that can be used to provide communication between multiple processor clusters while maintaining cache coherence is referred to herein as a cache coherence controller. The cache coherence controller 230 can be coupled to cache coherence controllers associated with other multiprocessor clusters. It should be noted that there can be more than one cache coherence controller in one cluster. The cache coherence controller 230 communicates with both processors 202a–d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of server 200 will be assumed. For example, most of the resources shown in FIG. 2 are assumed to reside on a single electronic assembly. In addition, memory banks 206a–206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to a specific embodiment and as shown in FIG. 2, both of I/O adapters 216 and 220 provide symmetric I/O access. That is, each provides access to equivalent sets of I/O. As will be understood, such a configuration would facilitate a partitioning scheme in which multiple partitions have access to the same types of I/O. However, it should also be understood that embodiments are envisioned in which partitions without I/O are created. For example, a partition including one or more processors and associated memory resources, i.e., a memory complex, could be created for the purpose of testing the memory complex.

According to one embodiment, service processor 212 is a Motorola MPC855T microprocessor which includes integrated chipset functions. The cache coherence controller 230 is an Application Specific Integrated Circuit (ASIC) supporting the local point-to-point coherence protocol. The cache coherence controller 230 can also be configured to handle a non-coherent protocol to allow communication with I/O devices. In one embodiment, the cache coherence controller 230 is a specially configured programmable chip such as a programmable logic device or a field programmable gate array.

Figure 3:
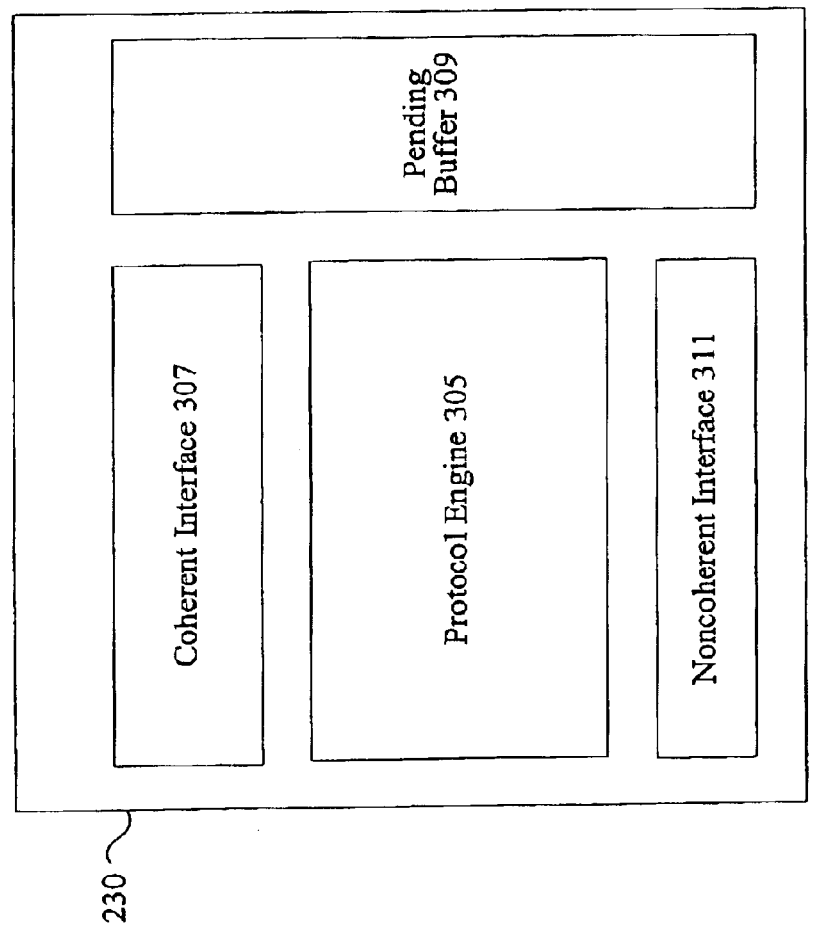
FIG. 3 is a diagrammatic representation of a cache coherence controller.

FIG. 3 is a diagrammatic representation of one example of a cache coherence controller 230. According to various embodiments, the cache coherence controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the cache coherence controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information.

The cache coherence controller has an interface such as a coherent protocol interface 307 that allows the cache coherence controller to communicate with other processors in the cluster as well as external processor clusters. According to various embodiments, each interface 307 and 311 is implemented either as a full crossbar or as separate receive and transmit units using components such as multiplexers and buffers. The cache coherence controller can also include other interfaces such as a non-coherent protocol interface 311 for communicating with I/O devices. It should be noted, however, that the cache coherence controller 230 does not necessarily need to provide both coherent and non-coherent interfaces. It should also be noted that a cache coherence controller in one cluster can communicate with a cache coherence controller in another cluster.

Figure 4:
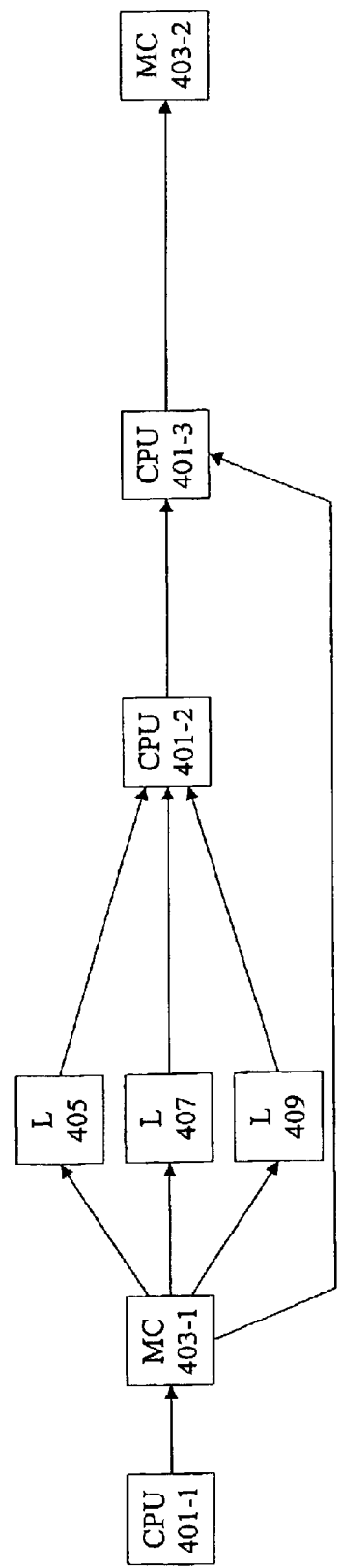
FIG. 4 is a diagrammatic representation showing a transaction flow for a data access request from a processor in a single cluster.

FIG. 4 is a diagrammatic representation showing the transactions for a cache request from a processor in a system having a single cluster without using a cache coherence controller. A processor 401-1 sends an access request such as a read memory line request to a memory controller 403-1. The memory controller 403-1 may be associated with this processor, another processor in the single cluster or may be a separate component such as an ASIC or specially configured Programmable Logic Device (PLD). To preserve cache coherence, only one processor is typically allowed to access a memory line corresponding to a shared address space at anyone given time. To prevent other processors from attempting to access the same memory line, the memory line can be locked by the memory controller 403-1. All other requests to the same memory line are blocked or queued. Access by another processor is typically only allowed when the memory controller 403-1 unlocks the memory line.

The memory controller 403-1 then sends probes to the local cache memories 405, 407, and 409 to determine cache states. The local cache memories 405, 407, and 409 then in turn send probe responses to the same processor 401-2. The memory controller 403-1 also sends an access response such as a read response to the same processor 401-3. The processor 401-3 can then send a done response to the memory controller 403-2 to allow the memory controller 403-2 to unlock the memory line for subsequent requests. It should be noted that CPU 401-1, CPU 401-2, and CPU 401-3 refer to the same processor.

FIGS. 5A–5D are diagrammatic representations depicting cache coherence controller operation. The use of a cache coherence controller in multiprocessor clusters allows the creation of a multiprocessor, multicluster coherent domain without affecting the functionality of local nodes in each cluster. In some instances, processors may only support a protocol that allows for a limited number of processors in a single cluster without allowing for multiple clusters. The cache coherence controller can be used to allow multiple clusters by making local processors believe that the non-local nodes are merely a one or more local nodes embodied in the cache coherence controller. In one example, the processors in a cluster do not need to be aware of processors in other clusters. Instead, the processors in the cluster communicate with the cache coherence controller as though the cache coherence controller were representing all non-local nodes. In addition, although generally a node may correspond to one or a plurality of resources (including, for example, a processor), it should be noted that the terms node and processor are often used interchangeably herein. According to a particular implementation, a node comprises multiple sub-units, e.g., CPUs, memory controllers, I/O bridges, etc.

It should be noted that nodes in a remote cluster will be referred to herein as non-local nodes or as remotes nodes. However, non-local nodes refer to nodes not in a request cluster generally and includes nodes in both a remote cluster and nodes in a home cluster. A cluster from which a data access or cache access request originates is referred to herein as a request cluster. A cluster containing a serialization point is referred to herein as a home cluster. Other clusters are referred to as remote clusters. The home cluster and the remote cluster are also referred to herein as non-local clusters.

Figure 5A:
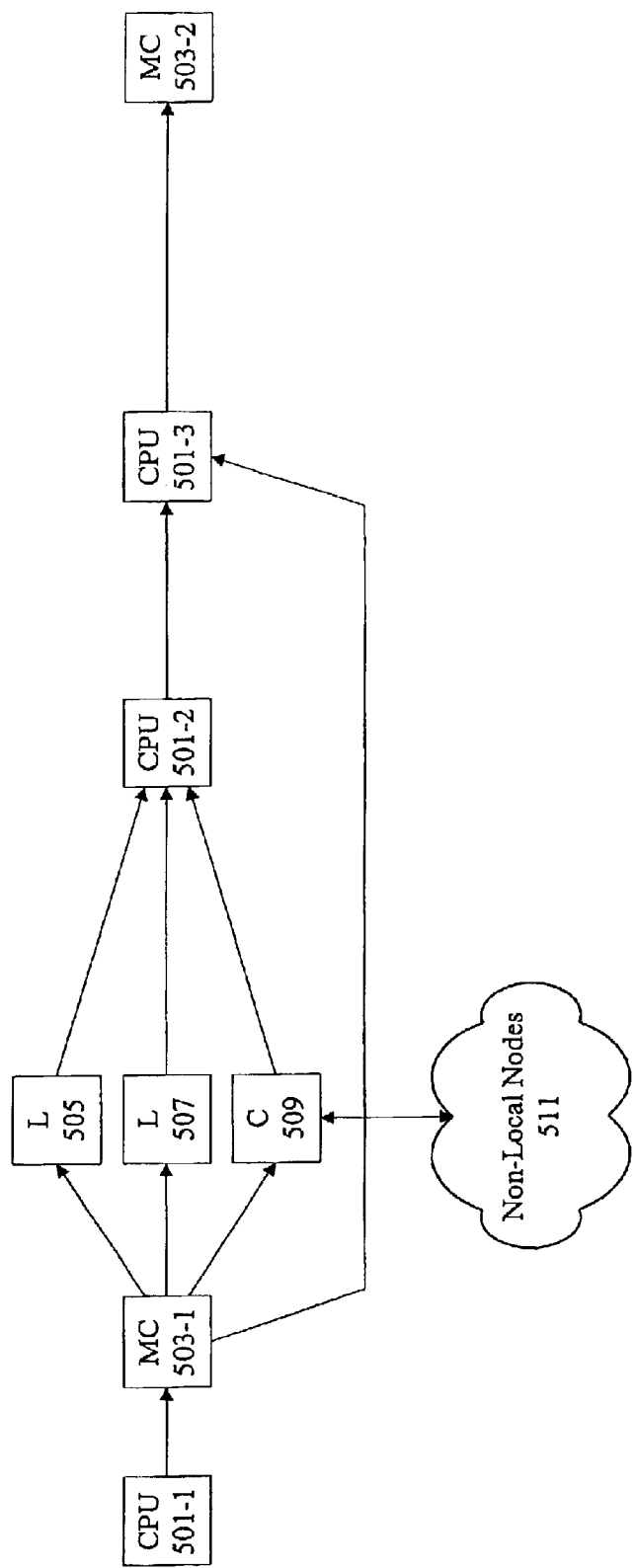
FIGS. 5A–5D are diagrammatic representations showing cache coherence controller functionality.

FIG. 5A shows the cache coherence controller acting as an aggregate remote cache. When a processor 501-1 generates a data access request to a local memory controller 503-1, the cache coherence controller 509 accepts the probe from the local memory controller 503-1 and forwards it to non-local node portion 511. It should be noted that a coherence protocol can contain several types of messages. In one example, a coherence protocol includes four types of messages; data or cache access requests, probes, responses or probe responses, and data packets. Data or cache access requests usually target the home node memory controller. Probes are used to query each cache in the system. The probe packet can carry information that allows the caches to properly transition the cache state for a specified line. Responses are used to carry probe response information and to allow nodes to inform other nodes of the state of a given transaction. Data packets carry request data for both write requests and read responses.

According to various embodiments, the memory address resides at the local memory controller. As noted above, nodes including processors and cache coherence controllers outside of a local cluster are referred to herein as non-local nodes. The cache coherence controller 509 then accumulates the response from the non-local nodes and sends a single response in the same manner that local nodes associated with cache blocks 505 and 507 send a single response to processor 501-2. Local processors may expect a single probe response for every local node probed. The use of a cache coherence controller allows the local processors to operate without concern as to whether non-local nodes exist.

It should also be noted that components such as processor 501-1 and processor 501-2 refer herein to the same component at different points in time during a transaction sequence. For example, processor 501-1 can initiate a data access request and the same processor 501-2 can later receive probe responses resulting from the request.

Figure 5B:
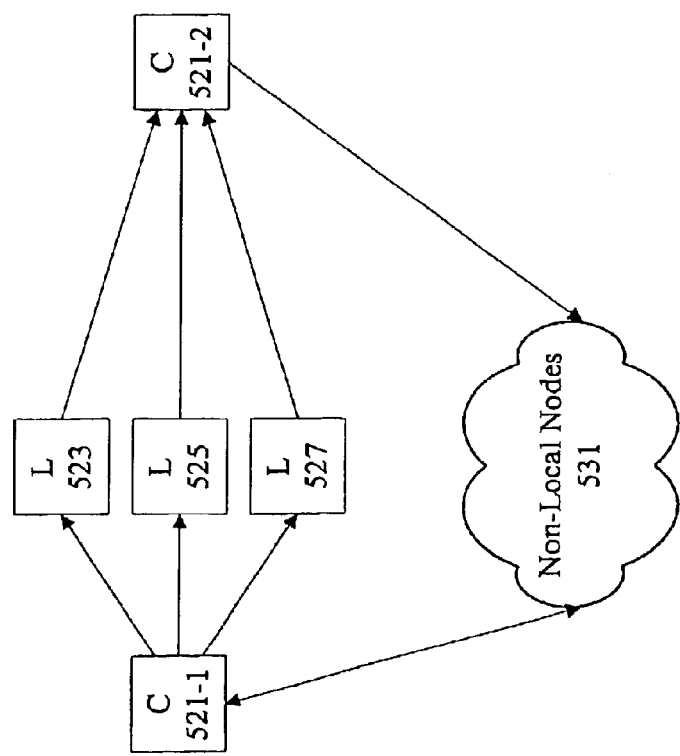

FIG. 5B shows the cache coherence controller acting as a probing agent pair. When the cache coherence controller 521-1 receives a probe from non-local nodes 531, the cache coherence controller 521-1 accepts the probe and forwards the probe to local nodes associated with cache blocks 523, 525, and 527. The cache coherence controller 521-2 then forwards a final response to the non-local node portion 531.

In this example, the cache coherence controller is both the source and the destination of the probes. The local nodes associated with cache blocks 523, 525, and 527 behave as if the cache coherence controller were a local processor with a local memory request.

Figure 5C:
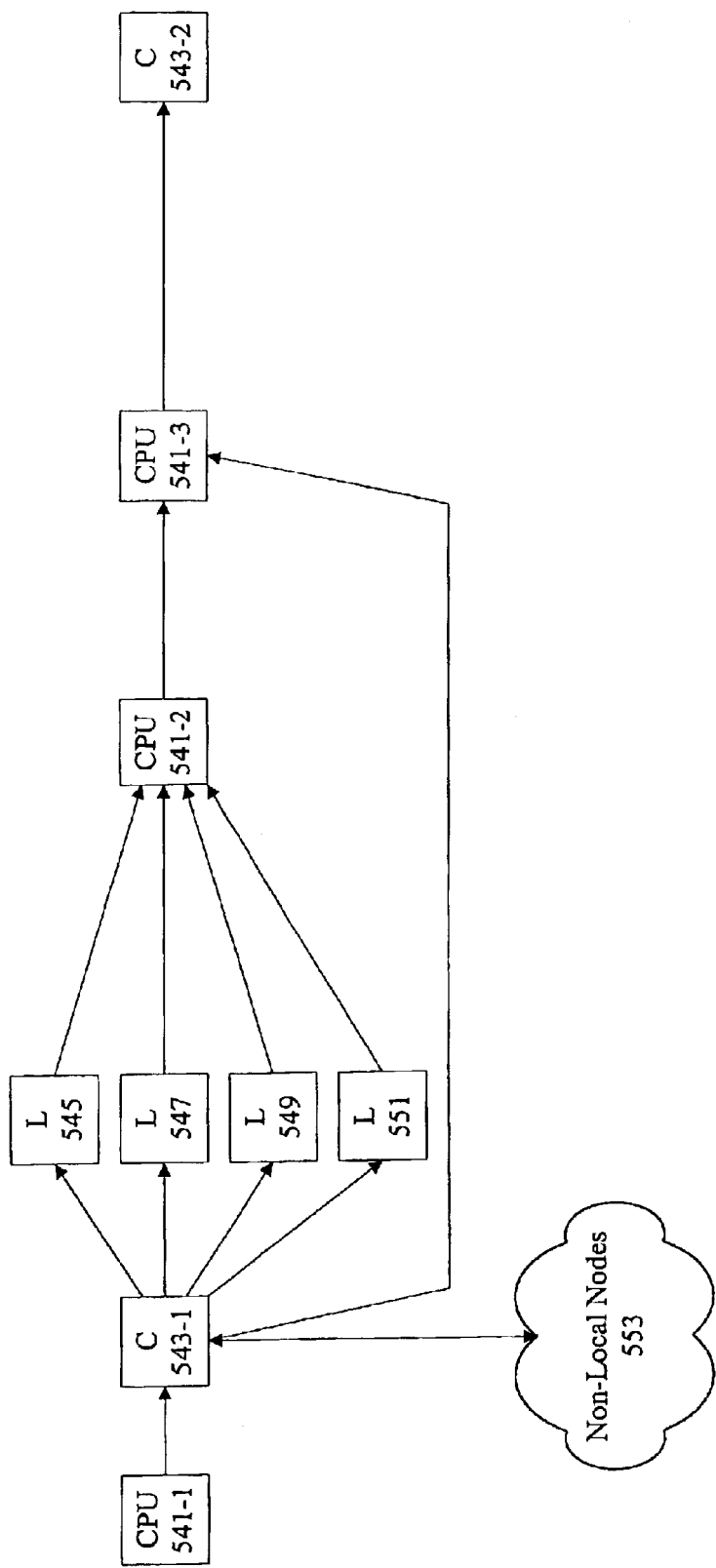

FIG. 5C shows the cache coherence controller acting as a remote memory. When a local processor 541-1 generates an access request that targets remote memory, the cache coherence controller 543-1 forwards the request to the non-local nodes 553. When the remote request specifies local probing, the cache coherence controller 543-1 generates probes to local nodes and the probed nodes provide responses to the processor 541-2. Once the cache coherence controller 543-1 has received data from the non-local node portion 553, it forwards a read response to the processor 541-3. The cache coherence controller also forwards the final response to the remote memory controller associated with non-local nodes 553.

Figure 5D:
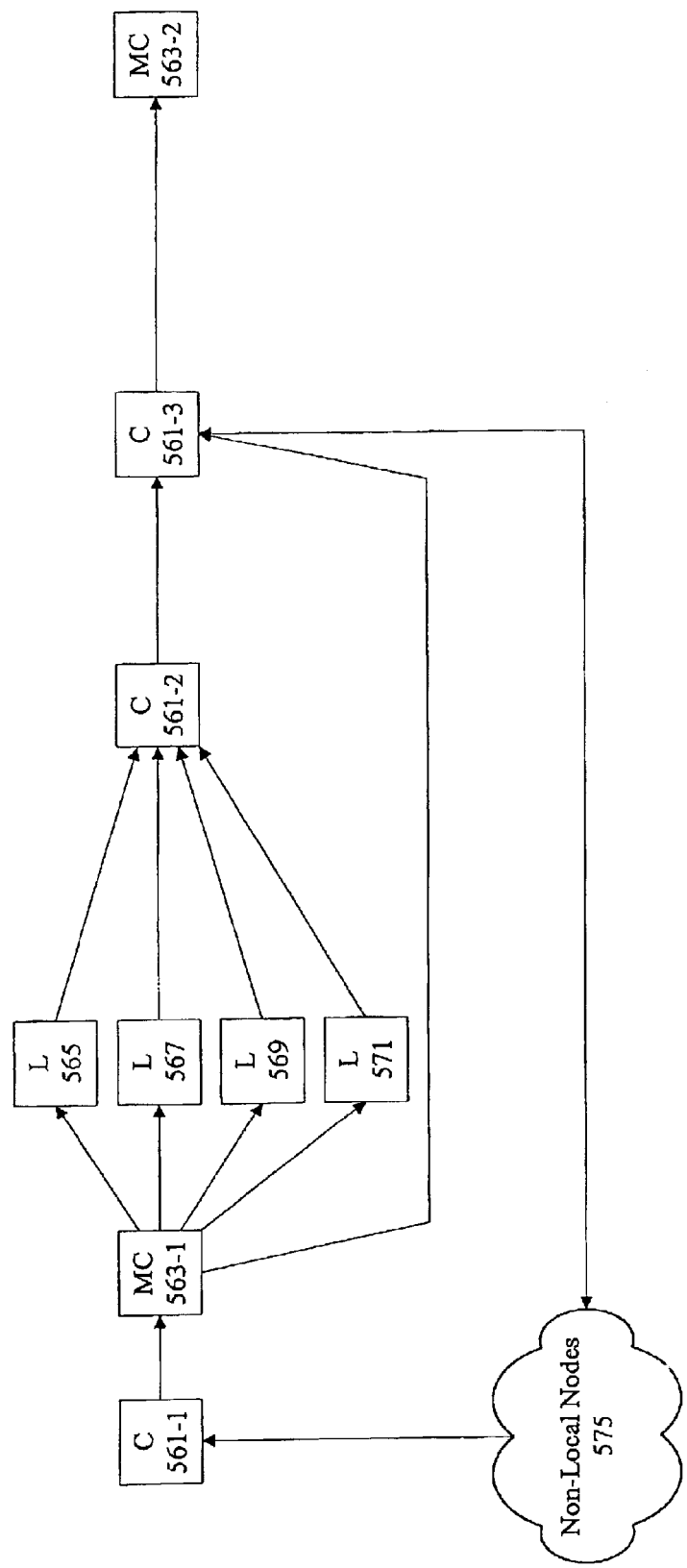

FIG. 5D shows the cache coherence controller acting as a remote processor. When the cache coherence controller 561-1 at a first cluster receives a request from a processor in a second cluster, the cache coherence controller acts as a first cluster processor on behalf of the second cluster processor. The cache coherence controller 561-1 accepts the request from portion 575 and forwards it to a memory controller 563-1. The cache coherence controller 561-2 then accumulates all probe responses as well as the data fetched and forwards the final response to the memory controller 563-2 as well as to non-local nodes 575.

By allowing the cache coherence controller to act as an aggregate remote cache, probing agent pair, remote memory, and remote processor, multiple cluster systems can be built using processors that may not necessarily support multiple clusters. The cache coherence controller can be used to represent non-local nodes in local transactions so that local nodes do not need to be aware of the existence of nodes outside of the local cluster.

Figure 6:
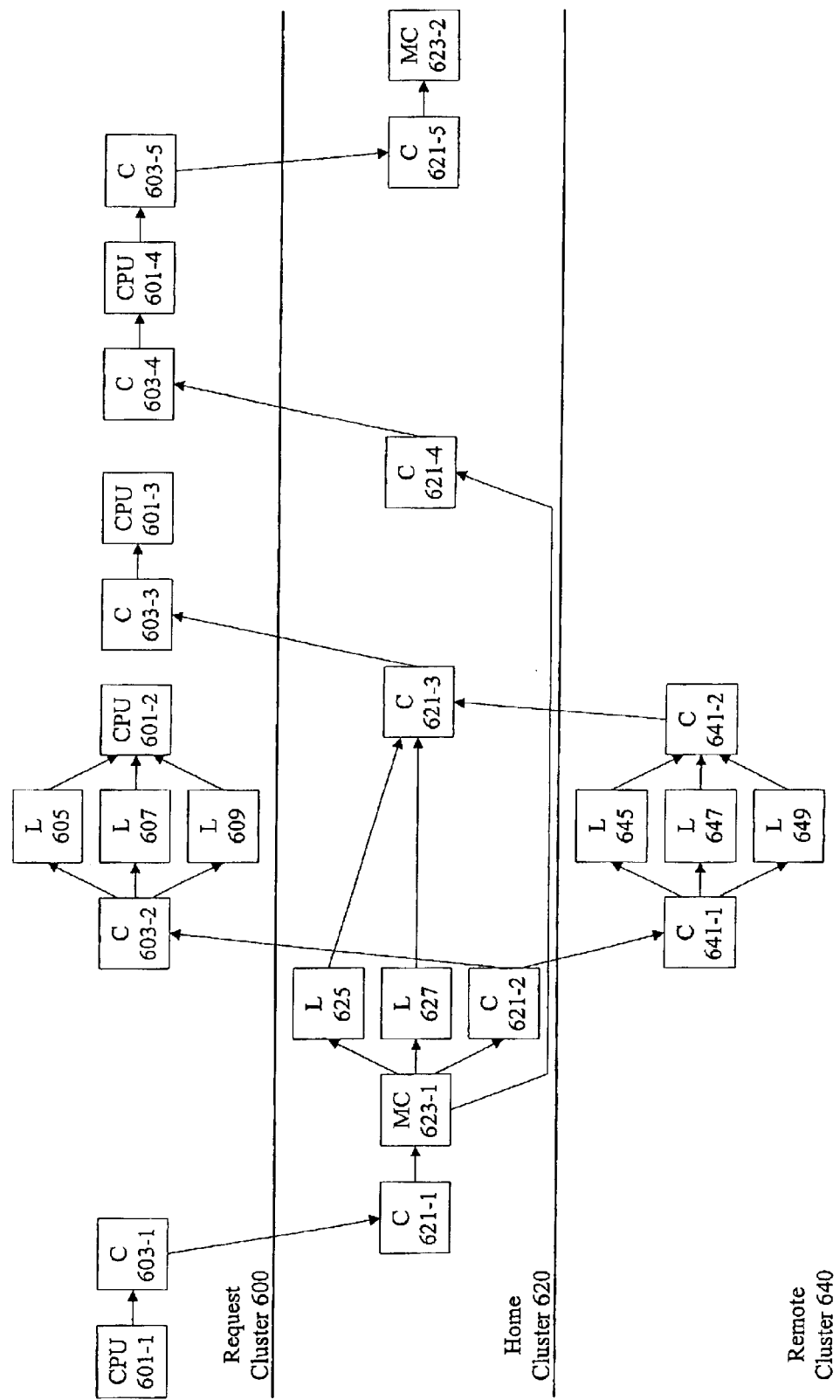
FIG. 6 is a diagrammatic representation depicting a transaction flow for a probe request with multiple probe responses.

FIG. 6 is a diagrammatic representation depicting the transactions for a data request from a local processor sent to a non-local cluster using a cache coherence controller. The multicluster system includes a request cluster 600, a home cluster 620, and a remote cluster 640. As noted above, the home cluster 620 and the remote cluster 640 as well as any other clusters excluding the request cluster 600 are referred to herein as non-local clusters. Processors and cache coherence controllers associated with local and non-local clusters are similarly referred to herein as local processors, local cache coherence controllers, non-local processors, and non-local cache coherence controllers, respectively.

According to various embodiments, processor 601-1 in a local cluster 600 sends a data access request such as a read request to a cache coherence controller 603-1. The cache coherence controller 603-1 tracks the transaction in the pending buffer of FIG. 3 and forwards the request to a cache coherence controller 621-1 in a home cluster 620. The cache coherence controller 621-1 at the home cluster 620 receives the access request and tracks the request in its pending buffer. In one example, information associated with the requests are stored in the pending buffer. The cache coherence controller 621-1 forwards the access request to a memory controller 623-1 also associated with the home cluster 620. At this point, the memory controller 623-1 locks the memory line associated with the request. In one example, the memory line is a unique address in the memory space shared by the multiple processors in the request cluster 600, home cluster 620, and the remote cluster 640. The memory controller 623-1 generates a probe associated with the data access request and forwards the probe to local nodes associated with cache blocks 625 and 627 as well as to cache coherence controller 621-2.

It should be noted that although messages associated with requests, probes, responses, and data are described as forwarded from one node to another, the messages themselves may contain variations. In one example, alterations are made to the messages to allow the multiple cluster architecture to be transparent to various local nodes. It should be noted that write requests can be handled as well. In write requests, the targeted memory controller gathers responses and sends the responses to the processor when gathering is complete.

The cache coherence controller 641-1 associated with the remote cluster 640 receives a probe from cache coherence controller 621-2 and probes local nodes associated with cache blocks 645, 647, and 649. Similarly, the cache coherence controller 603-2 associated with the request cluster 600 receives a probe and forwards the probe to local nodes associated with cache blocks 605, 607, and 609 to probe the cache blocks in the request cluster 600. Processor 601-2 receives probe responses from the local nodes associated with cache blocks 605, 607, and 609.

According to various embodiments, cache coherence controller 621-3 accumulates probe responses and sends the probe responses to cache coherence controller 603-3, which in turn forwards the probe responses to the processor 601-3. Cache coherence controller 621-4 also sends a read response to cache coherence controller 603-4, which forwards the read response to processor 601-4. While probes and probe responses carry information for maintaining cache coherency in the system, read responses can carry actual fetched data. After receiving the fetched data, processor 601-4 may send a source done response to cache coherence controller 603-5. According to various embodiments, the transaction is now complete at the requesting cluster 600. Cache coherence controller 603-5 forwards the source done message to cache coherence controller 621-5. Cache coherence controller 621-5 in turn sends a source done message to memory controller 623-2. Upon receiving the source done message, the memory controller 623-2 can unlock the memory line and the transaction at the home cluster 620 is now complete. Another processor can now access the unlocked memory line.

It should be noted that because the cache coherence controller 621-3 waits for remote cluster probe responses before sending a probe response to cache coherence controller 603-3, delay is introduced into the system. According to various embodiments, probe responses are gathered at cache coherence controller 603-3. By having remote clusters send probe responses through a home cluster, both home cluster probe responses and remote cluster probe responses can be delayed at the home cache coherence controller. In one example, remote cluster probe responses have to travel an additional hop in order to reach a request cluster. The latency for transmission of a probe response between a remote cluster and a request cluster may be substantially less than the latency for transmission of a probe response between a remote cluster and a request cluster through a home cluster. Home cluster probe responses are also delayed as a result of this added hop.

As will be appreciated by one of skill in the art, the specific transaction sequences involving requests, probes, and response messages can vary depending on the specific implementation. In one example, a cache coherence controller 621-3 may wait to receive a read response message from a memory controller 623-1 before transmitting both a probe response message and a read response message to a cache coherence controller 603-3. In other examples, a cache coherence controller may be the actual processor generating the request. Some processors may operate as both a processor and as a cache coherence controller. Furthermore, various data access request messages, probes, and responses associated with reads and writes are contemplated. As noted above, any message for snooping a cache can be referred to as a probe. Similarly, any message for indicating to the memory controller that a memory line should be unlocked can be referred to as a source done message.

It should be noted that the transactions shown in FIG. 6 show examples of cache coherence controllers performing many different functions, including functions of remote processors, aggregate local caches, probing agent pairs, and remote memory as described with reference to FIGS. 5A–5D.

The cache coherence controller 621-1 at the home cluster 620 is acting as a remote processor. When the cache coherence controller receives a request from a request cluster processor, the cache coherence controller is directed to act as the requesting processor on behalf of the request cluster processor. In this case, the cache coherence controller 621-1 accepts a forwarded request from processor 601-1 and sends it to the memory controller 623-1, accumulates responses from all local nodes and the memory controller 623-1, and forwards the accumulated responses and data back to the requesting processor 601-3. The cache coherence controller 621-5 also forwards a source done to the local memory controller 623-2.

The cache coherence controller 603-1 at the request cluster 600 is acting as a remote memory. As remote memory, the cache coherence controller is designed to forward a request from a processor to a proper remote cluster and ensure that local nodes are probed. In this case, the cache coherence controller 603-1 forwards a probe to cache coherence controller 621-1 at a home cluster 620. Cache coherence controller 603-2 also probes local nodes 605, 607, and 609.

The cache coherence controller 641-1 at the request cluster 640 is acting as a probing agent pair. As noted above, when a cache coherence controller acting as a probing agent pair receives a probe from a remote cluster, the cache coherence controller accepts the probe and forwards it to all local nodes. The cache coherence controller accumulates the responses and sends a final response back to the request cluster. Here, the cache coherence controller 641-1 sends a probe to local nodes associated with cache blocks 645, 647, and 649, gathers probe responses and sends the probe responses to cache coherence controller 621-3 at home cluster 620. Similarly, cache coherence controller 603-2 also acts as a probing agent pair at a request cluster 600. The cache coherence controller 603-2 forwards probe requests to local nodes including local nodes associated with cache blocks 605, 607, and 609.

The cache coherence controller 621-2 and 621-3 is also acting as an aggregate remote cache. The cache coherence controller 621-2 is responsible for accepting the probe from the memory controller 623-1 and forwarding the probe to the other processor clusters 600 and 640. More specifically, the cache coherence controller 621-2 forwards the probe to cache coherence controller 603-2 corresponding to request cluster 600 and to cache coherence controller 641-1 corresponding to remote cluster 640. As noted above, using a multiple cluster architecture may introduce delay as well as other undesirable elements such as increased traffic and processing overhead.

Probes are transmitted to all clusters in the multiple cluster system even though not all clusters need to be probed. For example, if a memory line associated with a probe request is invalid or absent from cache, it may not be necessary to probe all of the caches associated with the various clusters. In a system without a coherence directory, it is typically necessary to snoop all clusters. However, by using a coherence directory, the number of transactions in the system can be reduced by probing only a subset of the clusters in a system in order to minimize traffic and processing overhead.

By using a coherence directory, global memory line state information (with respect to each cluster) can be maintained and accessed by a memory controller or a cache coherence controller in a particular cluster. According to various embodiments, the coherence directory tracks and manages the distribution of probes as well as the receipt of responses. If coherence directory information indicates that probing of a specific cluster is not required, the probe to the specific cluster can be eliminated. In one example, a coherence directory indicates that probing of requesting and remote clusters is not necessary. A cache coherence controller in a home cluster probes local nodes without forwarding probes to the request and remote clusters. The cache coherence controller in the home cluster then sends a response to the request cluster after probe responses are received. However, in typical multiple cluster systems, a requesting cluster expects a predetermined number of responses from the various probed clusters. In one example, if the multiple cluster system includes four clusters, a request cluster would expect probe responses associated with nodes in all four clusters.

According to various embodiments, the techniques of the present invention provide a completion bit associated with a probe responses. The completion bit indicates to the requesting cluster that no other probe responses from other clusters should be expected. Any mechanisms for notifying a request cluster that no other probe responses should be expected from other clusters is referred to herein as a completion indicator. In one example, a completion indicator is a completion bit included in the response sent to a request cluster after local nodes are probed. In another example, a completion indicator is separate data transmitted to a request cluster. By using a coherence directory and a completion indicator, the number of transactions associated with probing various clusters can be reduced. For example, with reference to FIG. 6, probes to cache coherence controller 603-2 and cache coherence controller 641-1 can be eliminated. A single response with a completion indicator can be transmitted by cache coherence controller 621-4 to the request cluster 600.

FIG. 7 is one example of a coherence directory that can be used to allow management and filtering of probes. Various coherence directories are available. In one example, a full directory provides an entry for every memory line in a system. In this example, the coherence directory is maintained at the memory controller and is accessible by a cache coherence controller. However, in a system with a large amount of system memory, a full directory may not be efficient or practical. According to various embodiments, a sparse directory is provided with a limited number of entries associated with a selected set of memory lines. In one example, the coherence directory 701 includes state information 713, dirty data owner information 715, and an occupancy vector 717 associated with the memory lines 711. In some embodiments, the memory line states are modified, owned, shared, and invalid.

In the invalid state, a memory line is not currently available in cache associated with any remote cluster. In the shared state, a memory line may be present in more than one cache, but the memory line has not been modified in any of these caches. When a memory line is in the shared state, an occupancy vector 717 can be checked to determine what caches share the relevant data. An occupancy vector 717 may be implemented as an N-bit string, where each bit represents the availability of the data in the cache of N clusters. Any mechanism for tracking what clusters hold a copy of the relevant memory line in cache is referred to herein as an occupancy vector. The memory line with address 741 is in the shared state, and the occupancy vector 717 indicates that clusters 1 and 3 each have a copy of the shared memory line in cache.

In the modified state, a memory line has been modified and the modified copy exists in cache associated with a particular cluster. When a memory line is modified, dirty data owner information field 715 can be checked to determine the owner of the dirty data. Any mechanism for indicating what cluster owns a modified copy of the memory line in cache is referred to herein as a dirty data owner information field. In one example, the memory line associated with address 781 is modified, and the dirty data owner field 715 indicates that cluster 2 owns the memory line.

In the owned state, a dirty memory line is owned by a single cache but may be resident in multiple caches. It has been read by the owning cache, but has not been modified. In this case, the copy held in memory is stale. If the memory line is in the owned state, dirty data owner field 715 can be accessed to determine which cluster owns the dirty data. In one example, the memory line associated with address 761 is in the owned state and is owned by cluster 4. The occupancy vector 717 can also be checked to determine what other caches may have the relevant data. In this example, the occupancy vector 717 indicates that clusters 2, 3, and 4 each have a copy of the data associated with the memory line in cache.

Although the coherence directory 701 includes the four states of modified, owned, shared, and invalid, it should be noted that particular implementations may use a different set of states. In one example, a system may have the five states of modified, exclusive, owned, shared, and invalid. The techniques of the present invention can be used with a variety of different possible memory line states.

The coherence directory tracks the various transactions such as probe requests and responses in a multiple cluster system to determine when memory lines are added to the coherence directory, when memory lines are removed from the directory, and when information associated with each memory line is updated. By using the coherence directory, the techniques of the present invention recognize that the number of transactions such as probe requests can be reduced by managing or filtering probes that do not need to be sent to specific clusters.

FIG. 8 is a diagrammatic representation showing probe filter information that can be used to reduce the number of transactions in a multiple cluster system. Any criterion that can be used to reduce the number of clusters probed from a home cluster is referred to herein as probe filter information. Transactions such as probe requests can have a variety of characteristics. Some characteristics include whether the probe is a read block (read) 823 or a read block modify (read/write) 825. Other characteristics of the probe include the state of the memory line associated with the probe. In some examples, states include invalid 831, shared 833, owned 835, and modified 837. According to various embodiments, a coherence directory maintains information for memory lines in the local cluster that are cached in non-local clusters, where non-local clusters can include request and remote clusters.

If the state of the memory line associated with a probe is invalid 831 as indicated in the coherence directory, no copies of the memory line reside in other clusters. Consequently, only the home cluster needs to be probed and a completion bit can be used to indicate to a request cluster that the request cluster should expect only a single response from home cluster instead of a response from each of the clusters. If the memory line associated with the probe is in the shared state 833, and the transaction is a read transaction, only the home cluster needs to be probed and a completion bit can again be used to indicate to the request cluster that only a single response from home cluster should be expected (803).

For read transactions on owned memory lines, only the remote cluster with the line cached in the owned state needs to be probed. The remote cluster can transmit the response with a completion bit back to a request cluster. For transactions on modified memory lines, the probe can be sent to the remote cluster with the line cached in the modified state. Although transactions such as read block (read) and read block modify (read/write) are described, it should be noted that other transactions such as test and test and set are contemplated.

Figure 9:
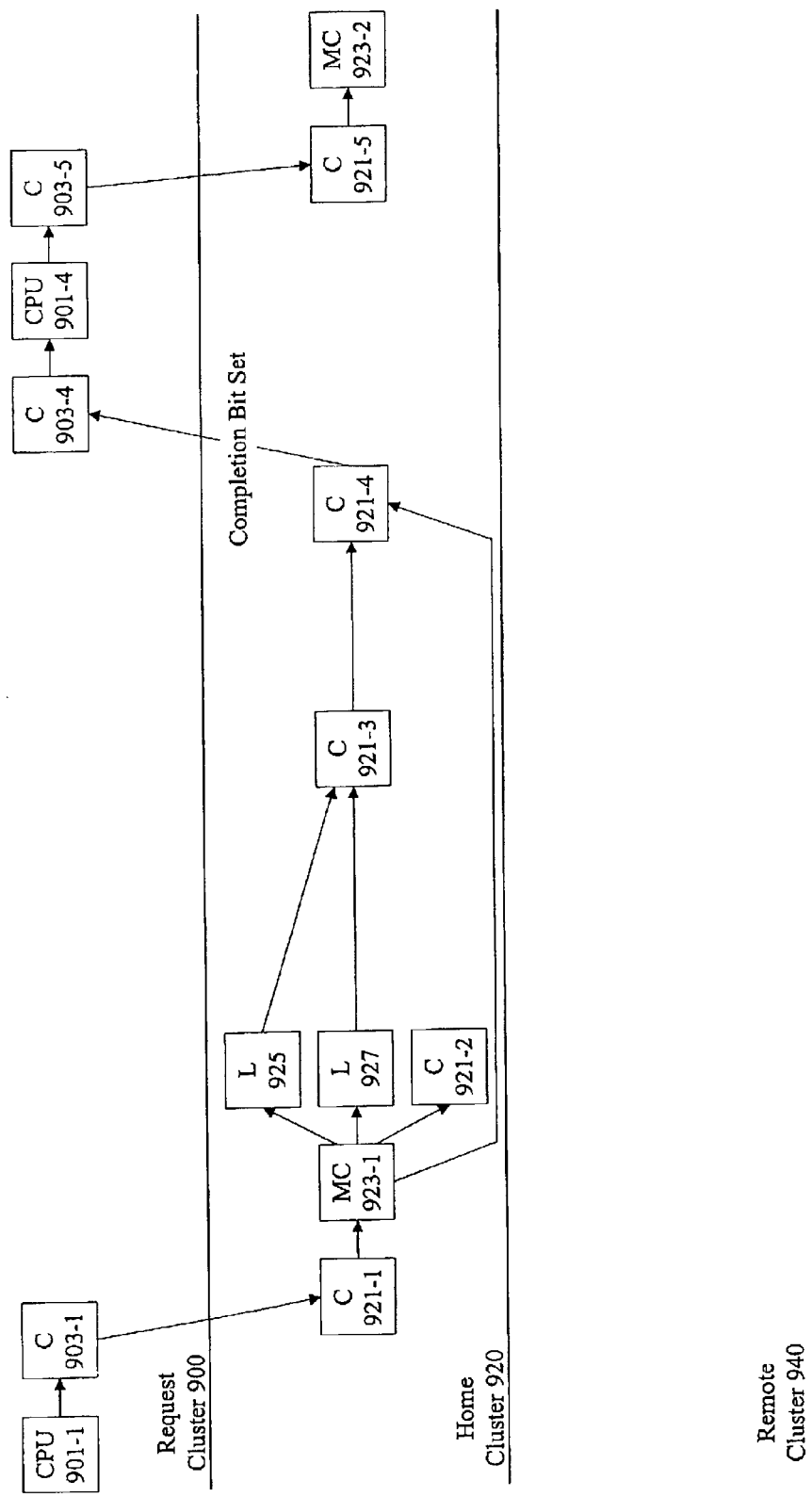
FIG. 9 is a diagrammatic representation showing a transaction flow for probing of a home cluster without probing of other clusters.

FIG. 9 is a diagrammatic representation depicting one example of transactions for probing only a home cluster as indicated in entries 801, 809, and 803 in FIG. 8. According to various embodiments, processor 901-1 in a local cluster 900 sends a data access request such as a read request to a cache coherence controller 903-1. The cache coherence controller 903-1 forwards the request to a cache coherence controller 921-1 in a home cluster 920. The cache coherence controller 921-1 at the home cluster 920 receives the access request and forwards the access request to a memory controller 923-1, which then probes local nodes 925, 927, and cache coherence controller 921-2. It should be noted that a cache coherence controller 921-1 is typically responsible for updating the coherence directory during various transactions. The cache coherence controller 921-2 determines characteristics associated with the probe from the memory controller 923-1 to determine whether remote probes are needed and whether a completion bit can be used. Here, the cache coherence controller 921-2 determines that no remote probes are needed and does not forward probes to the remote cluster 940 or to request cluster 900.

After cache coherence controller 921-4 receives the probe responses from local nodes as well as the read response from the memory controller 923-1, the response message with a completion indicator is transmitted to the request cluster. With the completion indicator, the request cluster does not wait for additional responses from other clusters. The coherence controller 903-4 forwards the response with the completion bit set to CPU 901-4. After receiving the response with the completion bit set, the CPU does not wait for additional responses from the local caches. CPU 901-4 forwards a source done message to cache coherence controller 903-5 to home cluster cache coherence controller 921-5, which can then perform updates of its coherence directory. The source done is then forwarded to memory controller 923-1.

Figure 10:
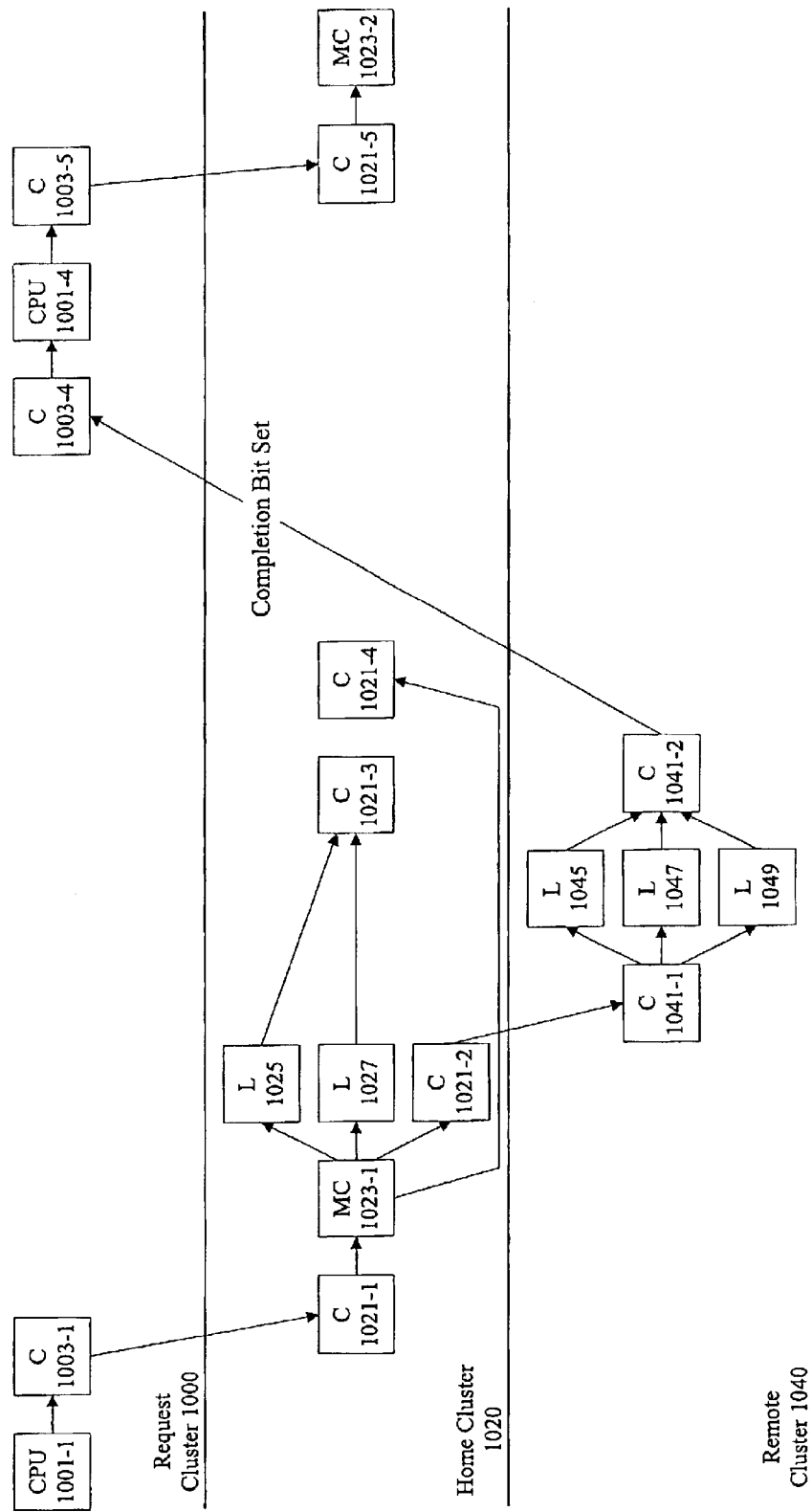
FIG. 10 is a diagrammatic representation showing a transaction flow for probing of a single remote cluster.

FIG. 9 shows one example of a sequence where only the home cluster needs to be probed. FIG. 10 shows one example of a sequence where only a single remote cluster needs to be probed. FIG. 10 is a diagrammatic representation depicting an example of transactions for probing a remote cluster as indicated in entries 805, 807, and 815 in FIG. 8. According to various embodiments, processor 1001-1 in a local cluster 1000 sends a data access request such as a read request to a cache coherence controller 1003-1. The cache coherence controller 1003-1 forwards the request to a cache coherence controller 1021-1 in a home cluster 1020. The cache coherence controller 1021-1 at the home cluster 1020 receives the access request and forwards the access request to a memory controller 1023-1, which then probes local nodes 1025, 1027, and cache coherence controller 1021-2. The cache coherence controller 1021-2 determines characteristics associated with the probe from the memory controller 1023-1 to determine whether remote probes are needed and whether a completion bit can be used. Here, the cache coherence controller 1021-2 determines that only a remote cluster needs to be probed and does not forward a probe to request cluster 1000.

After cache coherence controller 1021-4 receives the probes from local nodes as well as the read response from the memory controller 1023-1, a response message is not transmitted to the request cluster because the remote cluster is sending a response message with a completion indicator is transmitted to the request cluster. With the completion indicator, the request cluster does not wait for additional responses from other clusters. The response is forwarded to CPU 1001-4 and a source done message is sent from cache coherence controller 1003-5 to home cluster cache coherence controller 1021-5. With the completion bit set in the response to CPU 1001-4, it does not wait for any other local responses. After all responses from local nodes are received, the source done is then forwarded to memory controller 1023-1, which can then perform updates of its coherence directory.

Figure 11:
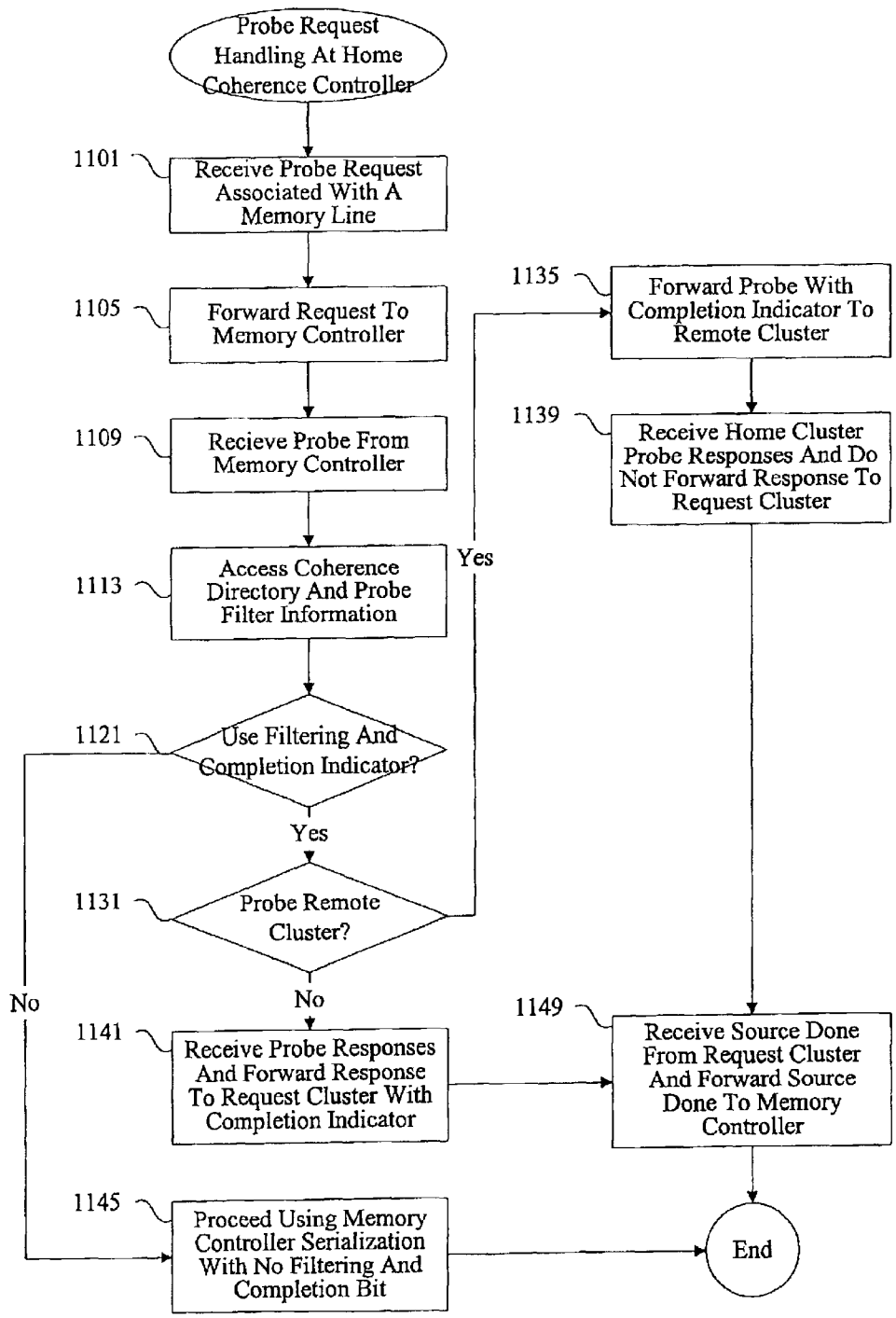
FIG. 11 is a flow process diagram showing the handling of a probe request with probe filter information.

FIG. 11 is a process flow diagram showing one example of a technique for handling probe requests at a home cache coherence controller. At 1101, a probe request associated with a memory line is received. At 1105, the cache coherence controller forwards the request to the memory controller. At 1109, the cache coherence controller receives a probe from the memory controller and accesses a coherence directory and probe filter information at 1113 to determine whether the number of probes to various clusters in the system can be reduced. At 1121, it is determined whether filtering and a completion indicator can be used. In one example, it is determined the filtering and a completion indicator can be used by identifying the criteria specified in FIG. 8 and by accessing a coherence directory and shown in FIG. 7.

If a completion indicator can not be used, probes are broadcast to the various nodes with no filtering and no completion bit 1145. If filtering and a completion indicator can be used, it is determined at 1131 if a remote cluster should be probed. If a single remote cluster is the cluster that should be probed, the probe is forwarded with the completion indicator to the remote cluster at 1135. At 1139, home cluster probe responses are received but are not forwarded to the request cluster. The response is not sent to the request cluster from home cluster because a remote cluster is sending a response with a completion indicator to the request cluster.

At 1149, source done information is received from the request cluster and forwarded to the memory controller. If it is determined at 1131 that only the home cluster needs to be probed, then the cache coherence controller at 1141 does not send probes to any request or remote clusters and instead sends a response to the request cluster with a completion indicator. The cache coherence controller sends the response with the completion indicator after receiving home cluster probe responses. At 1149, the cache coherence controller at the home cluster receives source done information from the request cluster and forwards the source done information to the memory controller.

According to various embodiments, when the only cluster that needs to be probed is the home cluster, only the nodes in the home cluster are probed. No probes are transmitted to any request or remote cluster. However, when the only cluster that needs to be probed is a remote or request cluster, not only are the nodes in the remote cluster probed, but the nodes in the home cluster are probed as well. According to various embodiments, the techniques of the present invention provide that when only a remote or request cluster needs to be probed, the memory controller can sometimes be bypassed to allow probing of only the remote or request cluster. In one example, a probe is not forwarded to the home cluster memory controller and a probe is forwarded directly to the remote cluster from the home cluster cache coherence controller.

FIG. 12 is a diagrammatic representation showing exemplary memory controller filter information. Any criterion used to reduce the number of requests forwarded to a memory controller is referred to herein as memory controller filter information. Characteristics of a probe can again be analyzed when a cache coherence controller receives the probe from a request cluster. Transactions such as probe requests can have a variety of characteristics. Some characteristics include whether the probe is a read block (read) 1223 or a read block modify (read/write) 1225. Other characteristics of the probe include the state of the memory line associated with the probe. In some examples, states include invalid 1231, shared 1233, owned 1235, and modified 1237. When the state of the memory line associated with the probe is invalid 1231, no remote probes are required because not remote clusters have a copy of the memory line in cache. The cache coherence controller also has no knowledge of the home cluster cache state. The probe is consequently forwarded to the memory controller.

For read block transactions on a shared memory line 1203, there is no need to probe the remote clusters as the home cluster contains a valid copy of the memory line in either cache or the memory controller. Consequently the probe is forwarded to the memory controller. For read block modify transactions on shared memory lines 1211, the local node state is unknown and the probe is sent to the memory controller.

For read block transactions on an owned memory line 1205, there is no need to send a probe request to the target or probe local nodes as the owned state implies that the home cluster caches are invalid or shared. A probe is forwarded directly to the owning cluster to acquire the cached data. For read block write transactions on an owned memory line 1213, the local state is unknown and consequently the request is forwarded to the memory controller. When the state of the memory line associated with the request is modified 1237, there is no need to probe local nodes, as a modified state implies the home cluster state is invalid. A probe is forwarded to the cluster owning the memory line.

Figure 13:
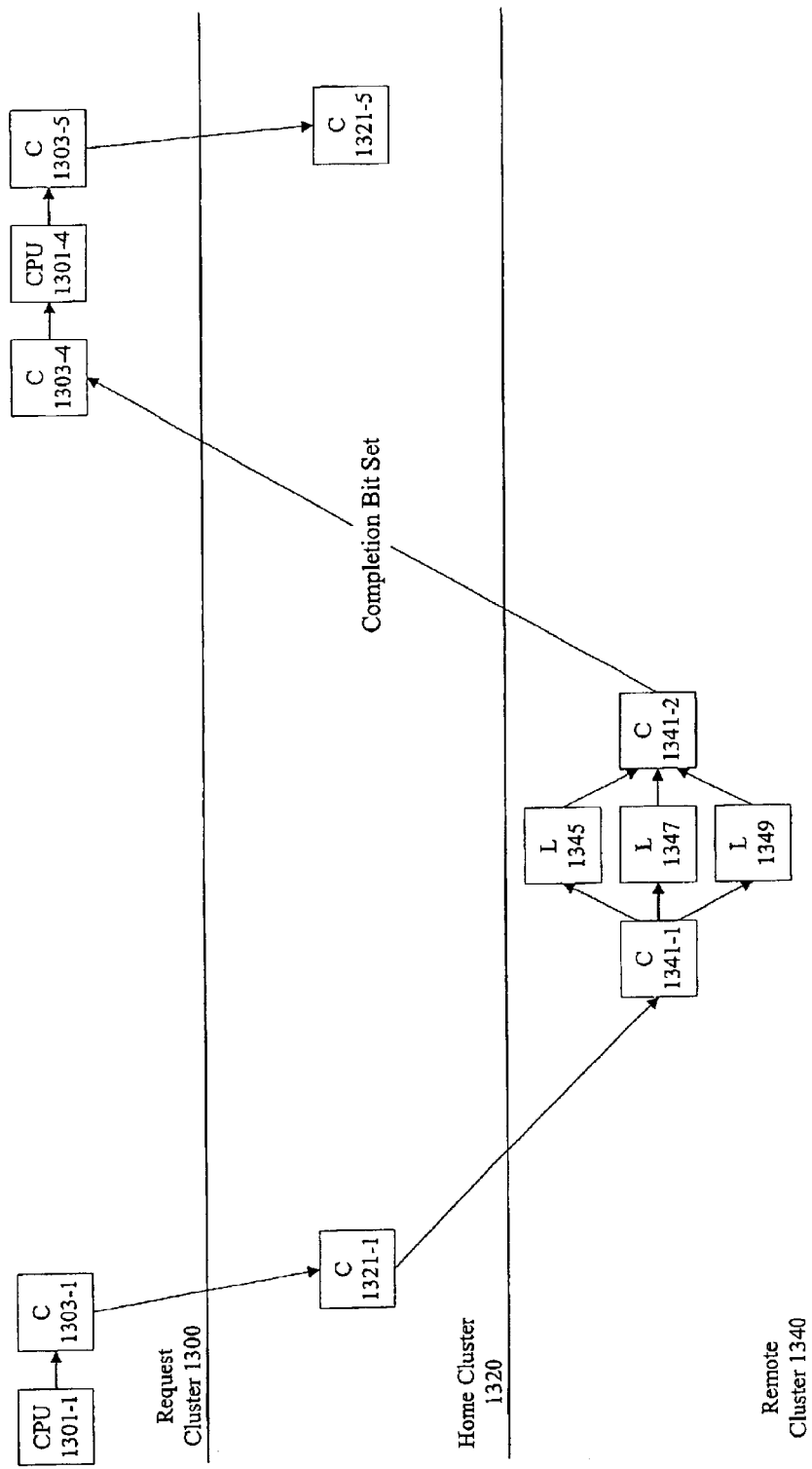
FIG. 13 is a diagrammatic representation showing a transaction flow for probing a single remote cluster without probing a home cluster.

FIG. 13 shows one example of a sequence where a probe does not need to be forwarded to the home cluster memory controller. According to various embodiments, processor 1301-1 in a local cluster 1300 sends a data access request such as a read request to a cache coherence controller 1303-1. The cache coherence controller 1303-1 forwards the request to a cache coherence controller 1321-1 in a home cluster 1320. The cache coherence controller 1321-1 at the home cluster 1320 receives the access request and determines whether the memory controller can be bypassed. Forwarding a probe to a remote or request cluster without forwarding the probe to a memory controller is referred to herein as bypassing the memory controller. In one embodiment, the determination can be made by using memory controller filter information. If the probe characteristics fall within entries 1205, 1207, or 1215, the memory controller is bypassed and the probe is forwarded to cache coherence controller 1341-1 in the remote cluster 1340. In one example, the probe is forwarded with an indication that a completion bit should be used.

The cache coherence controller 1321-1 in the home cluster 1320 is acting as a serialization point in place of the memory controller to maintain cache coherency. Once it is determined that the memory controller can be bypassed, the cache coherence controller 1321-1 blocks all other incoming requests and outgoing probes until a final source done is received from the request cluster. The remote cluster cache coherence controller 1341-1 probes remote cluster nodes and sends a response with a completion indicator to the request cluster 1300. The response is forwarded to CPU 1301-4 and a source done message is sent from cache coherence controller 1303-5 to home cluster cache coherence controller 1321-5. The source done is not forwarded to the memory controller, because the memory controller never processed the transaction.

Figure 14:
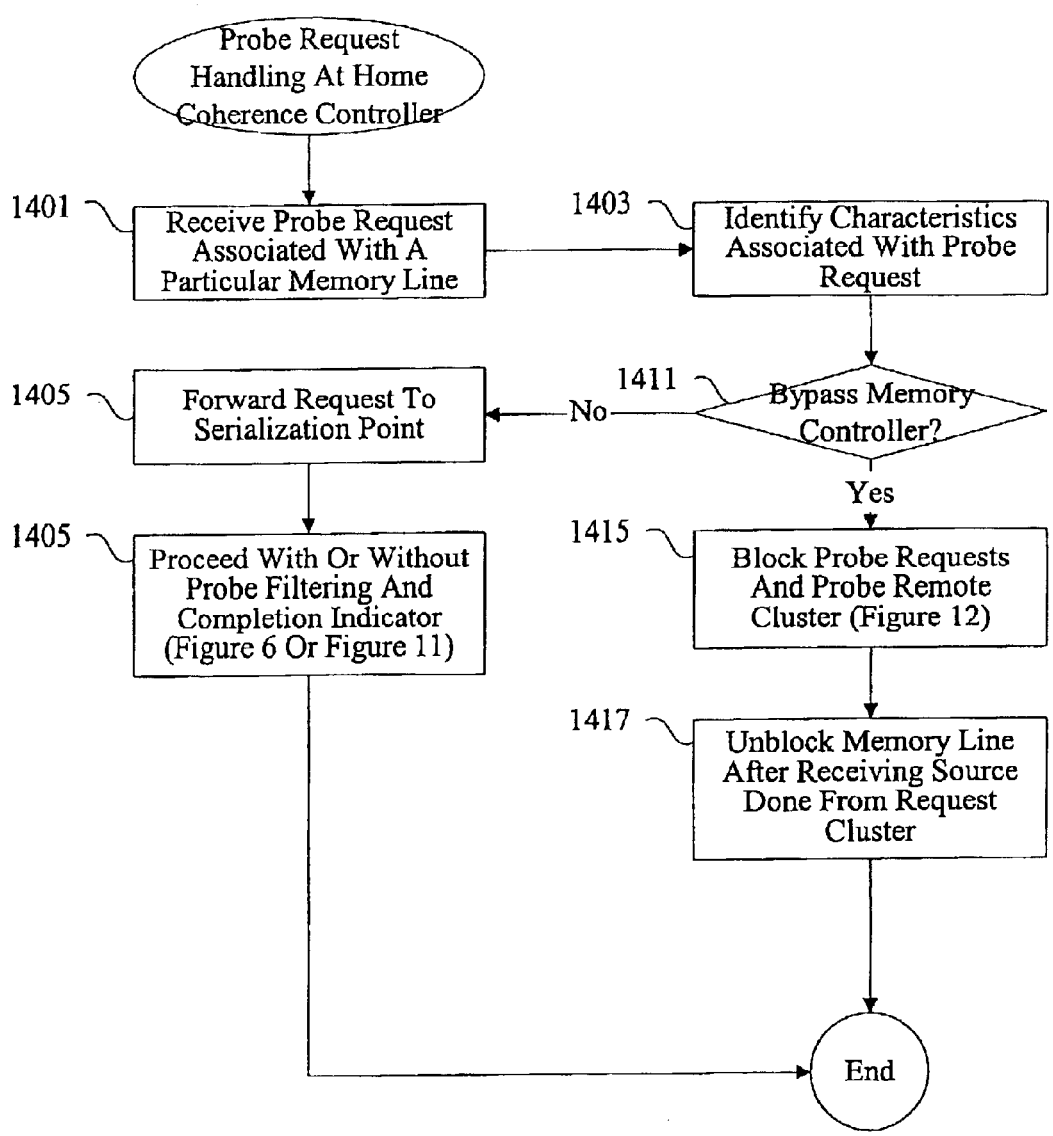
FIG. 14 is a flow process diagram showing the handling of a probe request at a home cluster cache coherence controller using memory controller filter information.

FIG. 14 is a flow process diagram showing probe request handling at a home cache coherence controller using memory controller filter information. At 1401, a probe request associated with a particular memory line is received. At 1403, characteristics associated with the probe request are identified. At 1411, it is determined if the memory controller can be bypassed. According to various embodiments, memory controller filter information shown in FIG. 12 is used to determine whether a memory controller can be bypassed. If it is determined that a memory controller can be bypassed, probe requests associated with the same memory line are blocked at 1415 and a probe is sent to a remote or a request cluster. At 1417, the memory line is unblocked after receiving a source done from the request cluster. If it is determined at 1411 that a memory controller can not be bypassed, the probe request is forwarded to a serialization point 1405. The transaction sequence can then proceed with or without probe filtering and a completion indicator as shown in 1109 of FIG. 11.

As described above, a cache coherence directory is a mechanism associated with each cache coherence controller which facilitates the tracking by that cache coherence controller of where particular memory lines within its cluster's memory are being cached in remote clusters. That is, a portion of the global memory space for the multi-cluster system is associated with each cluster. The cache coherence directory enables the cache coherence controller in each cluster to track which memory lines from the portion of the global memory space associated with its cluster have been cached with processors in remote clusters.

Each cache coherence controller in each cluster has such a cache coherence directory associated with it. Given the size of the memory space associated with each cluster, it is not practical to have an entry in the coherence directory for each memory line. Rather, the directory is sized in relation to the amount of cache memory associated with the processors in all remote clusters, a much smaller amount of memory. That is, the coherence directory is an associative memory which associates the memory line addresses with their remote cache locations. According to one embodiment, the cache coherence directory is fully associative. According to another embodiment, the directory is set-associative.

According to a specific embodiment, a typical entry in the cache coherence directory includes the memory address corresponding to the cached memory line, the remote cache location, whether the line is "clean" or "dirty," and whether the associated processor has read-only access or read/write access. This information corresponds to the standard coherence protocol states which include "invalid" (not cached in any remote clusters), "shared" (cached as "clean" and read-only), "modified" (cached as "dirty" and read/write), and "owned" (cached as "dirty" but read-only). A coherence directory entry also includes one or more fields identifying which, if any, of the remote clusters have the line cached in the "dirty" state, and which other clusters have the line cached in the "shared" state.

When the cache coherence controller in a particular cluster, e.g., the home cluster, receives a request for a particular memory line in its memory, it transmits the request to a memory controller associated with one of the local nodes to which the requested address maps, e.g., the home controller. To determine whether the most recently modified copy of the memory line resides in any of the cache memories in the system, the home controller then generates probes to all of the nodes in the cluster (including the cache coherence controller) asking whether any of the nodes have the requested memory line stored in their corresponding caches in either a "dirty" (i.e., modified) or "clean" (unmodified) state. These probes can tell the nodes to invalidate their copies of the memory line, as well as to return the memory line in the case where the memory line has been modified.

Because the cache coherence controller in each cluster maps to the remainder of the global memory space outside of its cluster, it is responsible for ensuring that the appropriate processors in remote clusters receive corresponding probes. This is where the cache coherence directory comes into play. Without such a mechanism, the cache coherence controller would have to transmit probes to all of the nodes in all of the remote cluster having cache memories associated with them. By contrast, because the cache coherence directory provides information about where memory lines are cached as well as their states, probes only need be directed toward the clusters in which the requested memory line is cached. The state of a particular cached line will determine what type of probe is generated.

The associative nature of the cache coherence directory of the present invention necessitates an eviction mechanism so that the most relevant information may be maintained in the limited number of directory entries. In addition, the distributed, multi-cluster architecture described herein also requires that the eviction mechanism be able to guarantee that the memory line corresponding to an evicted directory entry is purged from all remote caches. As mentioned above, the directory entry field indicating the location(s) of the memory line helps to reduce the number of transactions required to effect this purging. In addition, the appropriate type of request to effect the purging depends on the state of the remotely cached memory lines.

Thus, if a directory entry to be purged indicates that the line is only cached in the "clean" state, what is required is a mechanism which invalidates the memory line in each of the remote caches in which the line is cached. On the other hand, if the directory entry indicates that the line is in the "dirty" state in any of the remote caches, the modified memory line to memory must first be written back to memory before the line is invalidated.

In a conventional multiprocessor system, i.e., a system which does not have remote clusters of processors, there typically are not mechanisms by which external requests to a particular processor may be generated for the purpose of instructing the processor how to manage its cache. That is, in such a system, each processor is responsible for maintaining its own cache and evicting and/or writing lines back to memory to free up room for new entries. Thus, there is no provision for allowing one processor to instruct another processor to write a particular line back to memory. Similarly, there is no provision for allowing one processor to instruct another processor to invalidate a particular line in its cache without returning any data. That is, transactions between processor in a cache coherence protocol typically assume that one processor is trying to get a copy of the line from the other. Therefore, according to the present invention, mechanisms are provided for a system having a plurality of multiprocessor clusters by which such requests may be generated.

According to various specific embodiments of the invention, the semantics of transaction types developed for a single cluster system are altered to enable external devices to generate requests to specific processors to invalidate cache entries and to write cache entries back to memory. According to one embodiment which assumes the multi-cluster architecture described above, one such transaction type referred to herein as a "sized write" (i.e., a partial line write to memory) is employed to achieve the effect of instructing a processor having a "dirty" copy of a memory line stored in its cache to write the line back to memory.

The sized write transaction normally allows a processor to initiate a write to a any arbitrarily sized portion of a memory line (e.g., a particular byte or the entire line). That is, a request to write the byte to the memory line is sent to the memory controller which maps to the memory line. The memory controller then sends out a request to any other caches in the system having the corresponding line in the "dirty" state. If a positive response is received, i.e., if a modified copy of the line is returned in response to the request, the memory controller than merges the original byte with the retrieved memory line, and then writes the merged line back to memory.

Generally speaking, the eviction of a cache coherence directory entry corresponding to a "dirty" line in a remote cache requires that the remote cache write the line back to memory and invalidate its copy. Thus, a transaction is needed which results in the following actions:

1. A write back is generated for the cached memory line,
2. The copy of the line in the cache is invalidated, and
3. The eviction mechanism is notified when the memory line has been written back to memory.

According to a specific embodiment of the invention, the semantics of the sized write transaction are altered resulting in a transaction having these characteristics. The altered sized write is generated such that no data are provided for the partial write, i.e., the sized write request has zero size. When the cache coherence directory associated with the cache coherence controller in a particular cluster, i.e., the home cluster, determines that it needs to evict an entry which corresponds to remotely cached "dirty" memory line, it generates a sized write request specifying no data and directs the request to the local memory controller corresponding to the memory line, i.e., the home memory controller. The home memory controller then generates probes to all of the local nodes in the cluster (including the cache coherence controller) requesting the most recent copy of the memory line. The local nodes respond as described above, returning any dirty copy of the line and invalidating the corresponding entries in their caches.

As described above, the cache coherence controller forwards the probe to the appropriate remote cluster(s) based on the information in its associated cache coherence directory which indicates the existence and location of any remotely cached copies of the memory line. The nodes in remote clusters which receive the probe behave similarly to the local nodes in that they respond by returning any dirty copy of the line and invalidating the corresponding entries in their caches.

The home memory controller receives the "dirty" copy of the memory line (if one exists), performs a NOP (because there are no data to merge with the modified line), writes the line back to memory, and notifies the cache coherence directory (i.e., the originator of the transaction) that the transaction is complete. In this way, the "altered" sized write transaction is employed to achieve the effect of instructing a remote processor to write back a specific "dirty" line in its cache to memory.

According to a specific embodiment of the invention, the notification by the home memory controller that the transaction is complete plays an important part in avoiding race conditions. That is, because the coherence directory is in flux during the period of time required to complete an eviction, it is possible that subsequent transactions corresponding to the same memory line might be generated somewhere in the system. Fortunately, as described above, the memory controllers of the multicluster architecture described herein act as serialization points for memory transactions. That is, once a memory controller accepts a transaction for one of its memory lines, it blocks all other transaction to that same memory line. Therefore, once the home memory controller accepts the sized write transaction, it does not allow any further transactions for the same memory line until the eviction process is completed.

Generally speaking, the eviction of a cache coherence directory entry corresponding to a "clean" line in a remote cache requires that the remote cache invalidate its copy. Thus, a transaction is needed which results in the following actions:

1. The copy of the line in the cache is invalidated, and
2. The eviction mechanism is notified when the invalidation is complete.

Therefore, according to another embodiment of the invention, the semantics for another type of transaction referred to herein as a "validate block" transaction are altered to achieve these results. That is, the semantics of the validate block transaction are altered such that it has the effect of instructing remote systems nodes having "clean" copies of a memory line to invalidate those lines in their caches without resulting in any returned copies of the line in response to the request.

The validate block transaction is normally intended for the case in which a processor or I/O device (via the I/O bridge) writes an entire memory line of data atomically. This might occur, for example, when an I/O device, such as a disk drive, is writing blocks of data to memory. Such a transaction does not require a data response from the memory controller responsible for the memory line. In such a case, however, there still is a need to invalidate all cached copies of the line. The transaction saves the bandwidth that would normally be consumed to send the line from the memory controller to the processor or I/O bridge, which would be completely overwritten.

Therefore, according to a specific embodiment of the invention, when the cache coherence directory associated with the cache coherence controller in a particular cluster, i.e., the home cluster, determines that it needs to evict an entry which corresponds to one or more remotely cached "clean" memory lines, it generates a validate block request and directs the request to the local memory controller corresponding to the memory line, i.e., the home memory controller. The home memory controller then generates invalidating probes to all of the local nodes in the cluster (including the cache coherence controller). The local nodes invalidate their copies of the memory line and send confirming responses to home memory controller indicating that the invalidation took place.

The cache coherence controller forwards the invalidating probe to the appropriate remote cluster(s) based on the information in its associated cache coherence directory which indicates the existence and location of any remotely cached copies of the memory line. The remote nodes behave similarly to the local nodes in that they also invalidate any copies of the memory line and send the corresponding responses back to the cache coherence controller in the home cluster. The cache coherence controller aggregates the responses and transmits the aggregated response to the home memory controller.

The home memory controller receives the responses from the local nodes and the cache coherence controller, and notifies the cache coherence directory (i.e., the originator of the transaction) that the transaction is complete. The cache coherence directory then transmits a "source done" to the memory controller in response to which the memory line is freed up for subsequent transactions. In this way, the validate block transaction is employed to achieve the effect of instructing a remote processor to invalidate its copy of a "clean" memory line. As with the altered sized write transaction, the home memory controller acts as a serialization point for the validate block transaction thereby avoiding race conditions caused by subsequent transactions corresponding to the same memory line.

As described above, the eviction mechanism employed to effect an eviction of an entry from the cache coherence directory depends on the indicated state of the corresponding memory line, e.g., "clean" vs. "dirty." According to specific embodiments of the invention, the determination of which of the existing entries is to be evicted to make room for a new entry may be done in a wide variety of ways. For example, different approaches might select the oldest or least frequently used entries. According to one embodiment, "modified" lines are chosen ahead of "shared" lines, with a random mechanism being employed to select among like copies. It will be understood that any kind of policy for selecting the entry to be evicted may be employed without departing from the scope of the invention.

As described above, the serialization point of the home memory controller guarantees that transactions to the memory line corresponding to the directory entry being evicted will be locked out once the home memory controller receives the sized write or validate block request from the directory. However, it is possible that conflicting transactions may be generated during the time between when the cache coherence directory to evict a particular entry and the corresponding request is received by the memory controller. Until the sized write or validate block request corresponding to the entry being evicted is received by the memory controller, it is desirable to guarantee that any other requests corresponding to the same memory line are properly serviced.

Therefore, according to a specific embodiment of the invention, an eviction buffer is provided in the cache coherence directory in which the directory places the entry it has determined should be evicted. The entry in the eviction buffer remains visible to the cache coherence controller as one of the entries in the directory, i.e., the cache coherence controller cannot distinguish between entries in the directory and entries in the eviction buffer. The entry in the eviction buffer remains there until the home memory controller receives the corresponding eviction request from the cache coherence directory and the cache coherence controller receives a probe corresponding to the eviction request, at which point the entry in the eviction buffer is invalidated. However, if an intervening request corresponding to the entry in the eviction buffer is received, it may be processed by the cache coherence controller with reference to the eviction buffer entry and, because of the ordering of transactions at the memory controller serialization point, it is guaranteed that this intervening transaction will complete before the eviction request is serviced by the memory controller. In this way, a cache coherence directory entry may be "earmarked" for eviction, but may still be used for servicing subsequent requests until the memory line is locked by the home memory controller for the eviction process. According to a specific embodiment, if the eviction buffer is full, a status bit instructs the cache coherence controller to stall, i.e., to queue up any new requests for which there are no corresponding entries already in the cache coherence directory.

Figure 15:
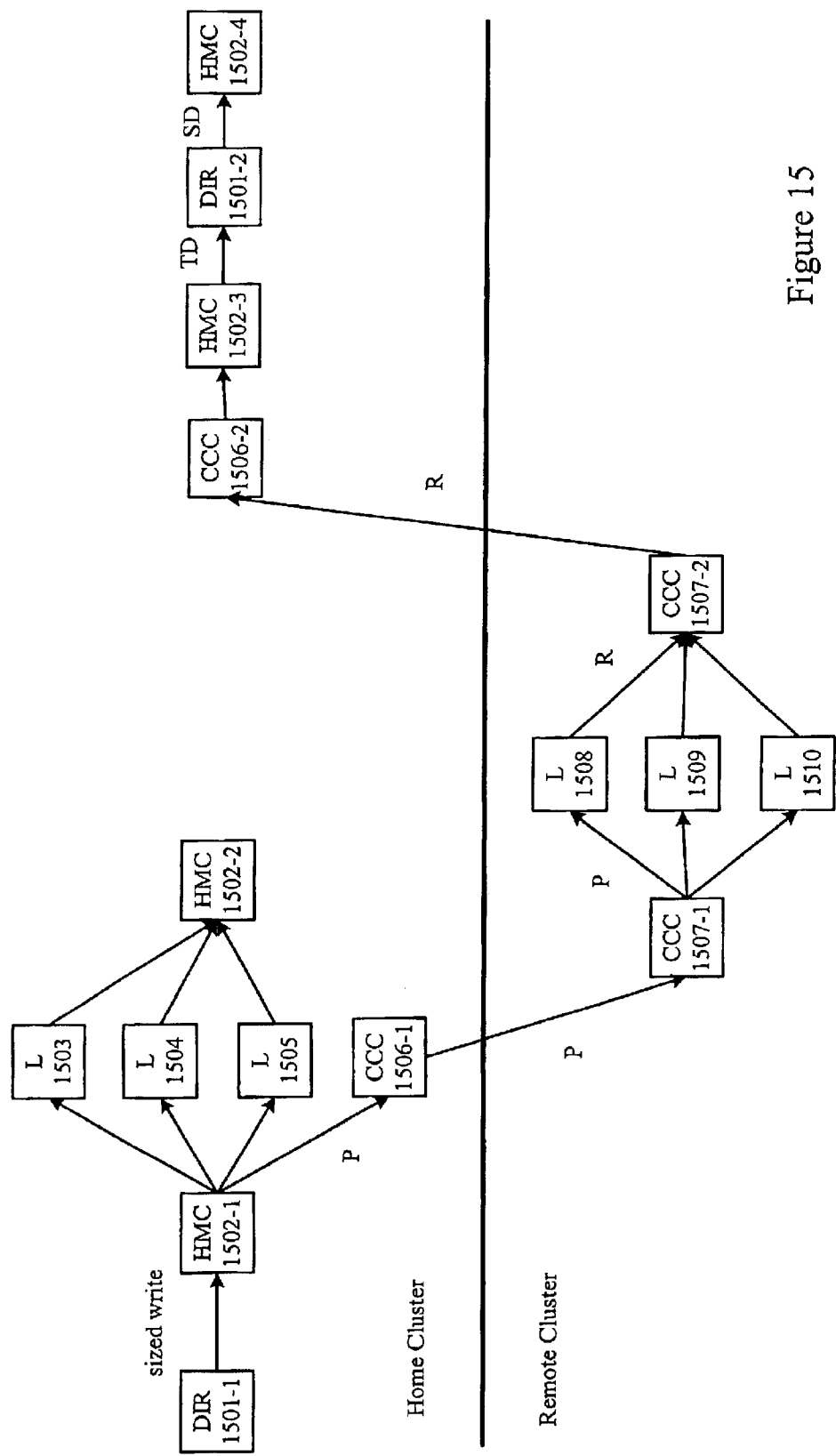
FIG. 15 is a diagrammatic representation showing a transaction flow for a cache coherence directory eviction of an entry corresponding to a dirty memory line.

FIG. 15 is a diagrammatic representation showing a transaction flow for a cache coherence directory eviction of a directory entry corresponding to a "dirty" memory line according to a specific embodiment of the invention. When the cache coherence directory 1501-1 determines that an eviction of one of its entries showing a "dirty" state must occur, e.g., in response to a new request for which no entry exists, it places the entry to be evicted into its eviction buffer and generates a sized write request (having zero size) to the local memory controller responsible for the memory line corresponding to the directory entry being evicted, i.e., the home memory controller 1502-1.

Assuming a previous transaction corresponding to the same memory line is not currently being processed, the home memory controller 1502-1 accepts the sized write request and generates invalidating probes to all nodes in its cluster including local nodes 1503–1505 and cache coherence controller 1506-1. Each of the local nodes 1503–1505 invalidates any copies of the memory line and responds accordingly to the home memory controller 1502-2. When the cache coherence controller 1506-1 in the home cluster receives the invalidating probe, it forwards the invalidating probe to the remote cluster having the dirty copy of the memory line according to the directory information (i.e., the entry in the eviction buffer). The directory entry in the eviction buffer is then invalidated.

The cache coherence controller 1507-1 in the remote cluster receives the invalidating probe and forwards it to the local nodes in the remote cluster, i.e., local nodes 1508–1510. The local node having the "dirty" copy of the memory line replies to cache coherence controller 1507-2 with a dirty data response (i.e., returning the modified copy of the memory line from its cache), and the other local nodes reply with clean responses. In addition, any copies of the memory line in the remote cluster's caches are invalidated. The cache coherence controller 1507-2 then forwards the dirty data response back to the cache coherence controller 1506-2 in the home cluster which forwards the response to the home memory controller 1502-3.

The home memory controller 1502-3 receives the dirty data response and merges the modified data with the data from the sized write request (i.e., no data). Once all responses from the local nodes are received by the home memory controller 1502-3, a target done (TD) message is sent by the home memory controller 1502-3 to the cache coherence directory 1501-2 which completes the transaction with a source done (SD) message back to the home memory controller 1502-4, which then unlocks the memory line for subsequent transactions.

Figure 16:
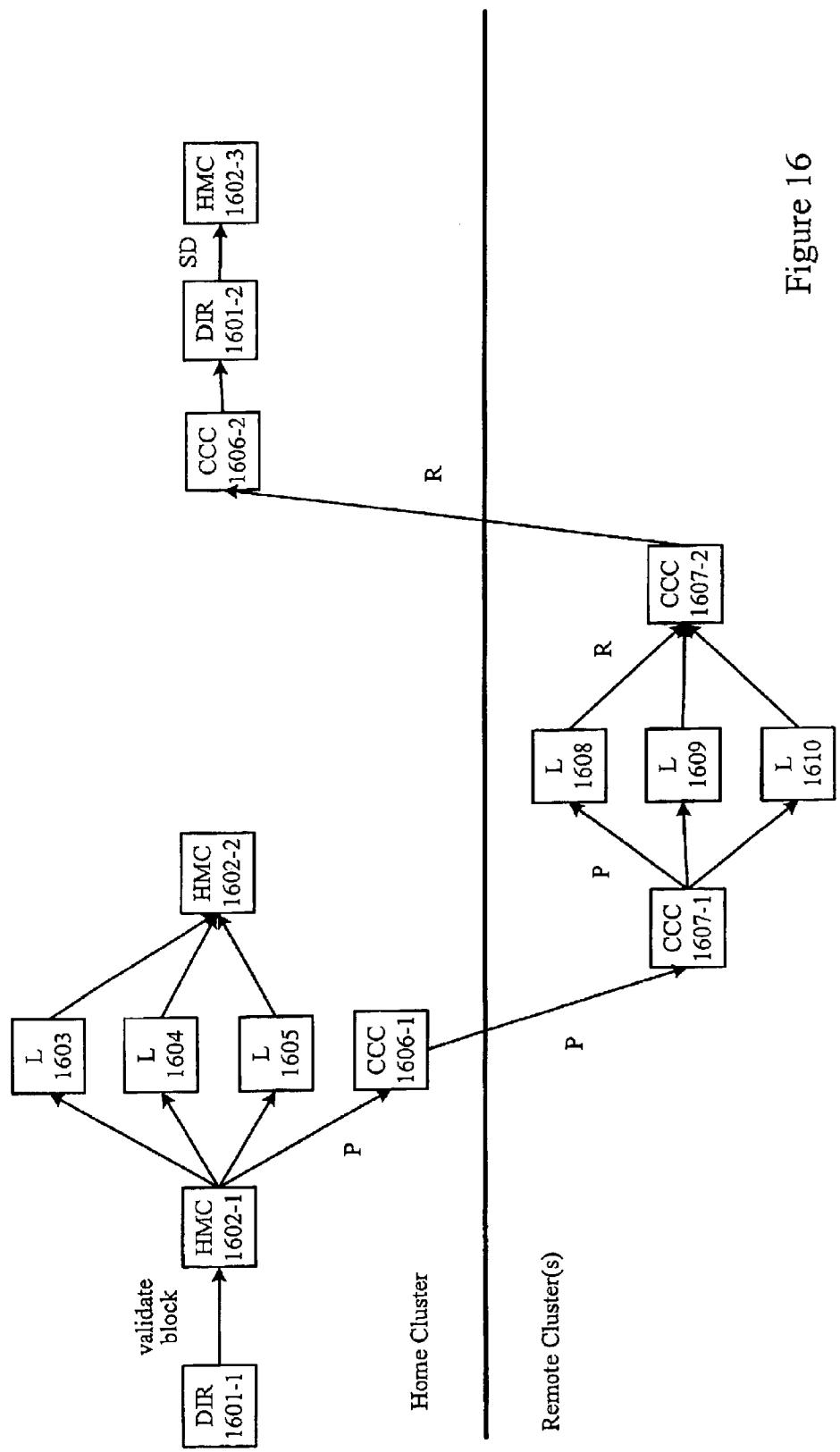
FIG. 16 is a diagrammatic representation showing a transaction flow for a cache coherence directory eviction of an entry corresponding to a clean memory line.

FIG. 16 is a diagrammatic representation showing a transaction flow for an eviction of a directory entry corresponding to a "clean" memory line according to another specific embodiment of the invention. When the cache coherence directory 1601-1 determines that an eviction of one of its entries showing a "clean" state must occur it places the entry to be evicted into its eviction buffer and generates a validate block request for the corresponding memory line and sends the request to the local memory controller responsible for the memory line, i.e., the home memory controller 1602-1.

Assuming the memory line is not locked, the home memory controller 1602-1 accepts the validate block request and generates invalidating probes to all nodes in its cluster including local nodes 1603–1605 and cache coherence controller 1606-1. Each of the local nodes 1603–1605 invalidates any copies of the memory line and responds accordingly to the home memory controller 1602-2. When the cache coherence controller 1606-1 in the home cluster receives the invalidating probe, it forwards the invalidating probe to any remote clusters having a copy of the memory line according to the directory information (i.e., the entry in the eviction buffer). The directory entry in the eviction buffer is then invalidated.

The cache coherence controller 1607-1 in any such remote cluster receives the invalidating probe and forwards it to the local nodes in the remote cluster, i.e., local nodes 1608–1610. Each of the local nodes 1608–1610 having a copy of the line invalidates its copy and responds accordingly to the cache coherence controller 1607-2. The cache coherence controller 1607-2 aggregates and forwards these responses back to the cache coherence controller 1606-2 in the home cluster which sends a source done (SD) message to the home memory controller 1602-3, which then unlocks the memory line for subsequent transactions.

In general, the entry in the eviction buffer may be invalidated by an earlier request, such as a write by a local processor. When the invalidating probe, associated with the eviction request, reaches the coherence controller, it will find the directory entry in the eviction buffer invalid. In this case, the coherence controller responds to the probe request without generating any remote probes.

The foregoing description assumes that the cache coherence directory includes processing functionality, e.g., an eviction manager, which may, according to different embodiments of the invention, be implemented in a variety of ways. For example, the directory may include its own memory controller configured to manage the directory and implement the various functionalities described above. Alternatively, these functionalities may reside in application specific hardware, e.g., an ASIC, as a separate eviction manager. A further alternative might configure the cache coherence controller to incorporate at least some of the functionalities described.

Figure 17:
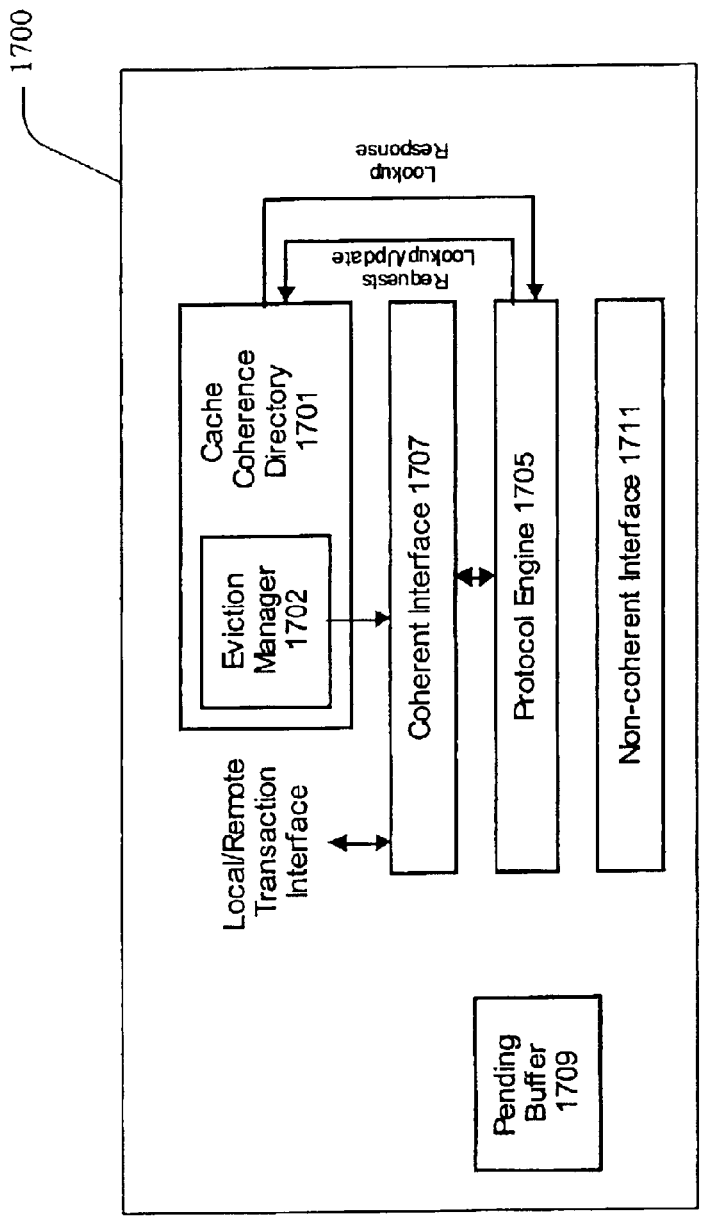
FIG. 17 is a diagrammatic representation of a cache coherence controller according to a specific embodiment of the invention.

According to a specific embodiment illustrated in FIG. 17, the eviction manager 1702 is part of the cache coherence directory 1701 which is a functional block within the cache coherence controller 1700. The protocol engine 1705 (which may actually be one or more protocol engines) is responsible for processing transactions and corresponds to the CCC blocks in FIGS. 15 and 16. The cache coherence directory corresponds to the DIR blocks in FIGS. 15 and 16. The remaining blocks within controller 1700 are similar to the corresponding blocks described above with reference to FIG. 3. Eviction manager 1702 communicates with protocol engine 1705 via coherent interface 1707. The protocol engine 1705 communicates with the coherence directory via a dedicated interface, which is used to communicate lookup and update commands and responses.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single cache coherence controller, or multiple cache coherence controllers can be used in a single cluster. Therefore, the scope of the invention should be determined with reference to the appended claims.

What is claimed is:

1. A computer system, comprising a plurality of processor clusters, each cluster including a plurality of local nodes and a cache coherence controller interconnected by a local point-to-point architecture, the computer system further comprising memory corresponding to a global memory space, each cluster corresponding to a contiguous portion of the global memory space, selected ones of the plurality of local nodes in each cluster having a memory controller associated therewith, each memory controller in each cluster being responsible for a memory range within the corresponding contiguous portion of the global memory space, the cache coherence controller in each cluster having a cache coherence directory associated therewith, entries in the cache coherence directory in each cluster corresponding to memory lines within the corresponding contiguous portion of the global memory space which are cached in remote clusters, the cache coherence controller being operable to initiate an eviction of a first one of the entries corresponding to an unmodified copy of a first memory line by sending a request to write to the first memory line to a first one of the memory controllers corresponding to the first memory line.

2. The computer system of claim 1 wherein the cache coherence directory is operable to designate the first entry to be evicted and maintain the first entry therein at least until the first memory controller allows the eviction to proceed.

3. The computer system of claim 1 wherein the cache coherence directory includes an eviction buffer, the cache coherence directory being operable to designate the first entry by placing the first entry in the eviction buffer.

4. The computer system of claim 3 wherein the cache coherence directory is further operable to invalidate the first entry in the eviction buffer in response to a communication from the first memory controller corresponding to the eviction.

5. The computer system of claim 1 wherein the first memory controller is operable to generate a plurality of invalidating probes in response to which all copies of the first memory line in the cache memories are invalidated.

6. The computer system of claim 5 wherein the cache coherence controller is operable to enable interaction by the associated processing nodes with processing nodes in others of the clusters in accordance with the associated cache coherence directory.

7. The computer system of claim 6 wherein the cache coherence controller includes the cache coherence directory.

8. The computer system of claim 6 wherein the cache coherence controller is operable using the cache coherence directory to forward the invalidating probes only to clusters having at least one copy of the first memory lines in the associated cache memories.

9. A cache coherence controller for use in a computer system comprising a plurality of processor clusters, each cluster including a plurality of local nodes and an instance of the cache coherence controller interconnected by a local point-to-point architecture, the computer system further comprising memory corresponding to a global memory space, each cluster corresponding to a contiguous portion of the global memory space, selected ones of the plurality of local nodes in each cluster having a memory controller associated therewith, each memory controller in each cluster being responsible for a memory range within the corresponding contiguous portion of the global memory space, the cache coherence controller including a cache coherence directory, entries in the cache coherence directory in each cluster corresponding to memory lines within the corresponding contiguous portion of the global memory space which are cached in remote clusters, the cache coherence controller being operable to initiate an eviction of a first one of the entries corresponding to an unmodified copy of a first memory line by sending a request to write to the first memory line to a first one of the memory controllers corresponding to the first memory line.

10. An integrated circuit comprising the cache coherence controller of claim 9.

11. The integrated circuit of claim 10 wherein the integrated circuit comprises an application-specific integrated circuit.

12. A set of semiconductor processing masks representative of at least a portion of a cache coherence controller, for use in a computer system comprising a plurality of processor clusters, each cluster including a plurality of local nodes and an instance of the cache coherence controller interconnected by a local point-to-point architecture, the computer system further including memory corresponding to a global memory space, each cluster corresponding to a continuous portion of the global memory space, selected ones of the plurality of local nodes in each cluster having a memory controller associated therewith, each memory controller in each cluster being responsible for a memory range within the corresponding contiguous portion of the global memory space, the semiconductor processing masks being operable to facilitate fabrication of the cache coherence controller including a cache coherence directory, entries in the cache coherence directory in each cluster corresponding to memory lines within the corresponding contiguous portion of the global memory space which are cached in remote clusters, the cache coherence controller being operable to initiate an eviction of a first one of the entries corresponding to an unmodified copy of a first memory line by sending a request to write to the first memory line to a first one of the memory controllers corresponding to the first memory line.

13. A computer implemented method for evicting entries in a cache coherence directory, the cache coherence directory being associated with a computer system comprising a plurality of processor clusters, each cluster including a plurality of local nodes and a cache coherence controller interconnected by a local point-to-point architecture, the computer system further comprising memory corresponding to a global memory space, each cluster corresponding to a contiguous portion of the global memory space, selected ones of the plurality of local nodes in each cluster having a memory controller associated therewith, each memory controller in each cluster being responsible for a memory range within the corresponding contiguous portion of the global memory space, the cache coherence controller in a first cluster having the cache coherence directory associated therewith, entries in the cache coherence directory corresponding to memory lines within the contiguous portion of the global memory space corresponding to the first cluster which are cached in remote clusters, the method comprising:

determining that a first one of the entries in the cache coherence directory should be evicted, the first entry corresponding to an unmodified copy of a first memory line;

generating a request to write to the first memory line, the request being directed to a first one of the memory controllers corresponding to the first memory line;

in response to the request, generating a plurality of invalidating probes to all of the local nodes and the cache coherence controller in the first cluster;

invalidating the first entry in the cache coherence directory in response to a first one of the invalidating probes received by the cache coherence controller;

forwarding the first invalidating probe to the remote clusters having at least one copy of the first memory line; and invalidating all copies of the first memory line in the cache memories.

* * * * *